US011521173B2

(12) United States Patent
Cooper et al.

(10) Patent No.: US 11,521,173 B2
(45) Date of Patent: Dec. 6, 2022

(54) METHODS AND SYSTEMS FOR PROCESSING PRODUCTS LISTED IN A LANDSCAPING PROJECT

(71) Applicant: Landscape Hub, Inc., Chicago, IL (US)

(72) Inventors: Charles Chadwick Cooper, Chicago, IL (US); Ajay Shriram Jakate, Chicago, IL (US); Zachary Samuel Pflederer, Champaign, IL (US)

(73) Assignee: LANDSCAPE HUB, INC., Chicago, IL (US)

( * ) Notice: Subject to any disclaimer, the term of this patent is extended or adjusted under 35 U.S.C. 154(b) by 0 days.

(21) Appl. No.: 17/641,794

(22) PCT Filed: Nov. 1, 2021

(86) PCT No.: PCT/US2021/057596
§ 371 (c)(1),
(2) Date: Mar. 9, 2022

(87) PCT Pub. No.: WO2022/094413
PCT Pub. Date: May 5, 2022

(65) Prior Publication Data
US 2022/0270042 A1    Aug. 25, 2022

Related U.S. Application Data

(60) Provisional application No. 63/107,844, filed on Oct. 30, 2020.

(51) Int. Cl.
*G06Q 10/08*    (2012.01)
*G06F 40/18*    (2020.01)
(Continued)

(52) U.S. Cl.
CPC ......... *G06Q 10/0875* (2013.01); *G06F 40/18* (2020.01); *G06Q 30/0635* (2013.01); *G06V 30/302* (2022.01)

(58) Field of Classification Search
CPC .......... G06Q 10/0875; G06Q 30/0635; G06Q 10/087; G06Q 10/08; G06F 40/18; G06V 30/302
(Continued)

(56) References Cited

U.S. PATENT DOCUMENTS 6,151,582 A    11/2000    Huang et al.
2003/0061122 A1    3/2003    Berkowitz et al.
(Continued)

OTHER PUBLICATIONS

International Search Report and Written Opinion in International Patent Application No. PCT/US21/57596, dated Jan. 22, 2022 (6 pages).

*Primary Examiner* — Edwyn Labaze
(74) *Attorney, Agent, or Firm* — Benesch, Friedlander, Coplan & Aronoff LLP

(57) ABSTRACT

A computer implemented method for processing products listed in a landscaping project, includes the steps of: collecting and capturing open format raw data of a material list; translating the captured data into text format data; mapping the text format data to generate a matched material list with associated procurement information; generating a smart spreadsheet including an array of smart cells; wherein at least one smart cell corresponds to a particular itemized plant name or landscaping supply to display a content match indicator. When the content match indicator is less than a target value, search for a substitute; forwarding to the client device, the smart spreadsheet for user's selections or modifications to the contents according to user's preference; in response to a user's modifying the content of the smart cell, (Continued)

updating the smart spreadsheet; and displaying a total cost estimate for bidding or for procurement for the landscaping project.

15 Claims, 34 Drawing Sheets

(51) Int. Cl.
*G06V 30/302* (2022.01)
*G06Q 30/06* (2012.01)

(58) Field of Classification Search
USPC .................................................... 705/29, 28
See application file for complete search history.

(56) References Cited

U.S. PATENT DOCUMENTS

| | | |
|---|---|---|
| 2006/0190391 A1 | 8/2006 | Cullen, III et al. |
| 2007/0162840 A1* | 7/2007 | Rochelle ............... G06F 16/972 715/209 |
| 2018/0096417 A1 | 4/2018 | Cook et al. |

* cited by examiner

1. Collector

1.1 Upload a List in LandscapeHub Standard Format (csv)

| Product_Name | Xxxxxxxxx Xxx | Xxxxxx | Xxx | Xxxxxxxxx |
|---|---|---|---|---|
| Xxxx Xxxx Xxxxx | xx Xxxxxxxxx | xx | | XXXXXXXXX |
| Xxxx Xxxx Xxxxx | xx Xxxxxxxxx | xx | | XXXXXXXXX |
| Xxxx Xxxx Xxxxx | xx Xxxxxxxxx | xx | | XXXXXXXXX |
| Xxxx Xxxx Xxxxx | xx Xxxxxxxxx | xx | | XXXXXXXXX |
| Xxxx Xxxx Xxxxx | xx Xxxxxxxxx | xx | | XXXXXXXXX |
| Xxxx Xxxx Xxxxx | xx Xxxxxxxxx | xx | | XXXXXXXXX |

102

1.2 Upload a Custom List in Tabular Format (csv,excel)

| What | Size | Xx |
|---|---|---|
| Xxxxxx Xxxxx Gold | 3" | 10 |
| Live Chat | 2" | 20 |
| Xxxxx Xxxx Xxxxx | 10"-12" | 10 |
| Xxxxx Xxxx | xx | 37 |
| Xxxxx Xxxx | xx | 2 |
| Xxxxx Xxxx | xx | 40 |

104

1.3 Transfer a Materials List from My ERP Estimating System

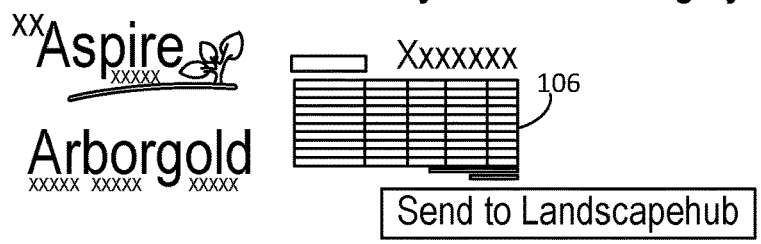

106

1.4 Material List Embedded in a Construction Drawing / Blueprint

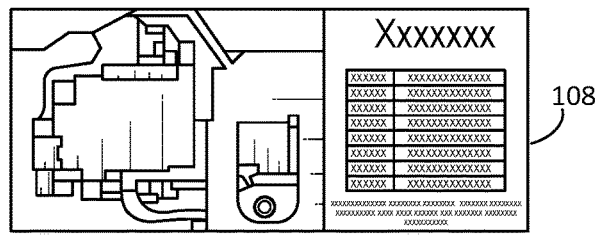

108

1.5 Take a Picture of the Materials List.

| Pool Area | | |
|---|---|---|
| Xxxx Xxxxx xxxxx | 2" | 2 |
| Xxxx Xxxxx xxxxx | 3 | 10 |
| Xxxx Xxxxx | 12 | 8 |

110

1.6 Copy and Paste My List from Spreadsheet/Email etc..

FIG. 1

2. Builder 200

2.1 Standard Plant Database

2.2 Standard Container/Size Database

2.3 Standard Container Mappings/Tranalations

| Xxxxxxxxx | Xxxxxxxxxxxx |
|---|---|
| XXXXXXX | XXXXXXX |
| XXXXXXXXXX | XXXXXXXXXX |
| XXXXXXXXXXXXX | XXXXXXXXXXXXX |
| XXXXXXXXXXXXX | XXXXXXX |

2.4 Supplier Inventory

| XXXXXXXXXXXXXX | XXXX | XXXX | XXXX | XXXX | XXXXX | XXX |
|---|---|---|---|---|---|---|
| XXXXXXXXXXXX | XXXXX | XXXX | XXXX | XXXX | XXXX | XXX |
| XXXXXXXXXXX | XXXXX | XXXX | XXXX | XXXX | XXXX | XXX |
| XXXXXXXXXX | | XXXX | XXXX | XXXX | XXXX | XXX |
| XXXXXXXXXX | | XXXX | XXXX | XXXX | XXXX | XXX |
| XXXXXXXXX | XX | XXXX | XXXX | XXXX | XXXX | XXX |
| XXXXXXXXXX | | XXXX | XXXX | XXXX | XXXX | XXX |
| XXXXXXXXXX | XX | XXXX | XXXX | XXXX | XXXX | XXX |

2.5 Machine Learning Algorthms

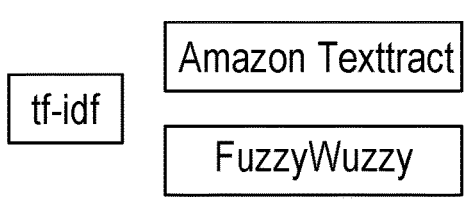

2.6 Regular Expression Rules Engine
/[\w._%+-]+@[\w,-]+\[a-zA-Z]{2,4}/

2.7 Lexer/Parser Engine

FIG. 2

FIG. 3 landscapehub

Search for Products | Q Search | Suppliers Plants Hard Goods | Hello,Chad | 🛒 Edit Quote (3)
Freffy Spring 2020

- Start Quote
- Place an Order
- Create a Hubsheet
- Q Search
- 📋 Orders
- ⭐ quotes
- 📄 Husheets
- ⊙ My Profile
- 📇 Company Profile
- ☆ Favorite Suppliers
- ? Help Center
- 📞 Contact Us Home>HubSheets

HubSheets
Upload your materials lists now!

⊕ New Hubsheet — 502

FF Pool
Create on 6/30/2020-Postal Code: 46350 - 23 items - Last Updated on 6/30/2020 → [Edit]

Pool
Created on 6/29/2020-Postal Code: 46350 - 23 items - Last Updated on 6/29/2020 → [Edit]

Test Mat List current
Created on 11/25/2019-Postal Code: N/A - 0 items - Last Updated on 11/25/2019 → [Edit]

Created on 3/26/2019-Postal Code: N/A - 3 items - Last Updated on 3/26/2019 → [Edit]

Byron Front Yard - 3341A
Created on 3/20/2019-Postal Code: N/A - 3 items - Last Updated on 3/20/2019 → [Edit]

| | | Product Name | Container | | | Quantity | |
|---|---|---|---|---|---|---|---|
| ⋮⋮⋮ | ☐ | Abelia Kaleidoscope | 2G | ◐ | △ | | 30 ▽ |
| ⋮⋮⋮ | ☐ | Product Matches | | | ▽ | | 15 ▽ |
| ⋮⋮⋮ | ☐ | Abelia Kaleidoscope | _702_ | ◐ | ▽ | | 4 ▽ |
| ⋮⋮⋮ | ☐ | ◉ RECOMMENDE MATCH (100%) | _710_ < | ◐ | ▽ | | 7 ▽ |
| ⋮⋮⋮ | ☐ | Abelia grandiflora 'Kaleidoscope' Kaleidoscope Glossy Abelia | ✓ | ○ | ▽ | | 4 ▽ |
| ⋮⋮⋮ | ☐ | Did we match the right product? Yes No | | ● | ▽ | | 10 ▽ |
| ⋮⋮⋮ | ☐ | OTHER OPETIONS (0) | | ◐ | ▽ | | 1 ▽ |
| ⋮⋮⋮ | ☐ | Swamp White Oak | 2'cal B&B | ◐ | ▽ | | 4 ▽ |

Home>HubSheets>FF Pool     FF Pool ✎

- Start Quote
- Place an Order
- Create a Hubsheet
- 🔍 Search
- 📋 Orders
- quotes
- Hushsheets
- My Profile
- Company Profile
- ☆ Favorite Suppliers
- ? Help Center

FIG. 7

Smart Cell for Pkg/Size Interaction
Home>Hubsheets>FF Pool

FF Pool

| | | Product Name | Container | Quantity | Estimated Price ⓘ | Budgeted |
|---|---|---|---|---|---|---|
| ⋮⋮⋮ | ☐ | Abelia Kaleidoscope ◉ ▽ | 2G | ○ ◁ 30 ▷ | $13.10 | 10.0 |
| ⋮⋮⋮ | ☐ | Buddleia Phscedelic... ◉ ▽ | | | $14.50 | 12.0 |
| ⋮⋮⋮ | ☐ | Liriope ◉ ▽ | | | $10.00 | 6.0 |
| ⋮⋮⋮ | ☐ | Adagio Eulalia Grass ◉ ▽ | | | $11.50 | 18.0 |
| ⋮⋮⋮ | ☐ | Armstrong Maple ◉ ▽ | | | $195.00 | 180.0 |
| ⋮⋮⋮ | ☐ | Little Lime Hyd. ○ ▽ | | | $32.00 | 30.0 |
| ⋮⋮⋮ | ☐ | Clump Whitesprite birch ◉ ▽ | #2 Container 12" | | | 200.0 |
| ⋮⋮⋮ | ☐ | Flowering Crab sugar... ◉ ▽ | #2 Container 15" | | $165.00 | 150.0 |
| ⋮⋮⋮ | ☐ | Swamp White Oak ◉ ▽ | #2 Container | | $189.00 | 190.0 |
| ⋮⋮⋮ | ☐ | Tulip tree ◉ ▽ | 2'cal B&B | ○ ▷ 3 ▷ | $194.35 | 200.0 |
| ⋮⋮⋮ | ☐ | Hackberry ◉ ▽ | | | $190.00 | 190.0 |
| ⋮⋮⋮ | ☐ | Serviceberry ◉ ▽ | 2'cal B&B | ◉ ▷ 9 ▷ | | 205.0 |

Popup (overlay) — Package/Size:

| Package ✎ | Caliper ✎ | Height ✎ | Width ✎ |
|---|---|---|---|
| #2 Container | N/A | N/A | N/A |

Package/Size Options:
- 2G
- #2 Container 12"  ☐
- #2 Container 15"  ☐
- #2 Container  ☑

FIG. 8B landscapehub — OSU Tennis Facility (In Progress) — Hello, Chad | 🛒 New Cart

< Exit | Home>HubSheets>OSU Tennis Fcility

Job Details ✏️
- Postal Code: 60613
- Supplier Radius (Miles): 100 Limits
- Anticipated Job Date: 10/15/2021

Freight ✏️
- Estimated Freight: $0.00
- Freight Factor: 0.0%

Truck Fill ✏️
- Truck Type: None Selected
- Truck Fill % Estimate: Select a truck

≡ Estimate Summary
- Total items (17)
- Market Price Estimate: $5,652.30
- Freight Estimate: $0.00
- Estimate Total: $5,652.30

Suppliers⊙  ⟲ Assign Suppliers  ⬆ Export Sheets

| | Product Name | | Package/Size | | Quantity | Estimated Unit Price | Budgeted Price | % Diff | Truck Fill | Notes | notes |
|---|---|---|---|---|---|---|---|---|---|---|---|
| ⋮⋮⋮ | ☐ Acer miyabei 'state street' | ⦿Matched▽ | 3"B&B | ⦿Matched▽ | 10 ▫⦿∆ | $284.55 ⦿Market Price▽ | $310.20 | 8.27% | | Notes | Straight trunk |
| ⋮⋮⋮ | ☐ Tulip tree | ⦿Matched▽ | 3"B&B | ⦿Matched▽ | Quantity<br>Original Entry<br>10 × | ⦿Market Price▽ | $240.00 | (29.38%) | | Notes | |
| ⋮⋮⋮ | ☐ PxA bloodgood | ⦿Matched▽ | 2 1/2"B&B | ⦿Matched▽ | ▫⦿ Limited | ▽ | $400.00 | | | Notes | |
| ⋮⋮⋮ | ☐ Diervilla lonicera 'Copper' | ⦿Matched▽ | #3" Container | ⦿Matched▽ | Availability<br>Several suppliers have this product in stock | ▽ | $16.00 | | | Notes | |
| ⋮⋮⋮ | ☐ Euonymus alatus 'coles... | ⦿Matched▽ | 36"B&B | ⦿Matched▽ | Quantity<br>On average, a single supplier can cover this quantity | ⦿Market Price▽ | $45.00 | (21.11%) | | Notes | |
| ⋮⋮⋮ | ☐ HP Limelight | ⦿Needs Review▽ | #5 | ⦿Nee | Proximity<br>The closest supplier with enough inventory is 25-100 miles away | ▽ | $20.00 | | | Notes | |
| ⋮⋮⋮ | ☐ HQ Snowqueen | ⦿Matched▽ | #5 | ⦿Nee | | ▽ | $32.00 | | | Notes | |
| ⋮⋮⋮ | ☐ Spiraea japonica 'Anthon... | ⦿Matched▽ | 3" Container | ⦿Matched▽ | | ⦿Market Price▽ | $16.75 | (7.46%) | | Notes | Clump from |

FIG. 8C landscapehub

< Back | Home>HubSheets> zelda homes        Hello, Chad | 🛒 New Cart zelda homes

| Product Matching ✏ | Location ✏ | Freight ✏ | Truck Fill ✏ | ⬇ Export  🔍 Find Suppliers |
|---|---|---|---|---|
| ◉ Matched/Confirmed 21 | Postal Code 60613 | Estimated Freight: $293.75 | Truck Type: None Selected | ≡ Estimate Summary |
| ◉ Needs Review 3 | Supplier Radius(Miles) No Limits | Freight Factor: 15.0% | Truck Fill % Estimate: Select a truck | Total items (17) |
| ⊘ No Match 0 | 910 | | | Market Price Estimate: — — $16,652.18 |
| | | | | Freight Estimate: — — — $293.75 |
| | | | | Estimate Total: $16,945.93 |

| ☐ Product Name | Package/Size | Quantity | Estimated Unit Price ⓘ | Budget Price |
|---|---|---|---|---|
| ☐ Acer miyabei 'State Street' | ✓Confirmed ▷ 3" | ◉Matched ▷ 2 | ▷ $382.50 | ◉Market Price ▷ $ 0 |
| ☐ Liriodendron tulipifera | ✓Confirmed ▷ 3" | ◉Matched ▷ 3 | ▷ $270.50 | ◉Market Price ▷ $ 0 |
| ☐ Ulmus 'Morton' | ✓Confirmed ▷ 4" | ◉Matched ▷ 3 | ▷ $310.50 | ◉Market Price ▷ $ 0 |
| ☐ Ulmus 'Morton Glossy' | ✓Confirmed ▷ 4" | ◉Matched ▷ 6 | ▷ $355.50 | ◉Market Price ▷ $ 0 |
| ☐ Amelancheir canadensis 'Aut... | ◉Matched ▷ 5' | ◉Matched ▷ 3 | ▷ $128.50 | ◉Market Price ▷ $ 0 |
| ☐ Continus coggygria 'Grace' | ◉Matched ▷ 6' | ◉Matched ▷ 2 | ▷ $0.00 | ▷ $ 0 |
| ☐ Syringa reticulata 'Ivory Silik' | ✓Confirmed ▷ 2.5" | ◉Matched ▷ 1 | ▷ $242.50 | ◉Market Price ▷ $ 0 |

FIG. 10 landscapehub

< Back | Home>HubSheets> zelda homes

Hello, Chad | 🛒 New Cart zelda homes ✱

This is the menu bar for HubSheets Tools — Find Suppliers Tool — 📤 Export  🔍 Find Suppliers — 1006

| Product Matching ✎ | Location ✎ | Freight ✎ | Truck Fill ✎ |
|---|---|---|---|
| ● Matched/Confirmed 21 | Postal Code 60613 | Estimated Freight: $293.75 | Truck Type: None Selected |
| ● Needs Review 3 | Supplier Radius (Miles) No Limits | Freight Factor: 15.0% | Truck Fill % Estimate: Select a truck |
| ⊘ No Match 0 | | | |

☰ Estimate Summary
Total items (17)
Market Price Estimate: - - - - $16,652.18
Freight Estimate: - - - - - $293.75
Estimate Total: $16,945.93

| ☐ Product Name | Package/Size | Quantity | Estimated Unit Price ⓘ | Budget Price |
|---|---|---|---|---|
| ☐ Acer miyabei 'State Street' | ✓Confirmed ▽ 3" | ◉Matched ▽ 2 | ▫▽ $382.50 | ▽ $ 0 |
| ☐ Liriodendron tulipifera | ✓Confirmed ▽ 3" | ◉Matched ▽ 3 | ▫▽ $270.50 | ▽ $ 0 |
| ☐ Ulmus 'Morton' | ✓Confirmed ▽ 4" | ◉Matched ▽ 6 | ▫▽ $310.50 | ▽ $ 0 |
| ☐ Ulmus 'Morton Glossy' | ✓Confirmed ▽ 4" | ◉Matched ▽ 3 | ▫▽ $355.50 | ▽ $ 0 |
| ☐ Amelancheir canadensis 'Aut... | ◉Matched ▽ 5' | | ▫▽ $128.50 | ▽ $ 0 | landscapehub

\<Back | Home>HubSheets> zelda homes zelda homes

Hello, Chad | 🛒 New Cart

| Product Matching ✎ | Location ✎ | Freight ✎ | Truck Fill ✎ |
|---|---|---|---|
| ⦿ Matched/Confirmed 21 | Postal Code 60613 | Estimated Freight: $293.75 | Truck Type: None Selected |
| ⦿ Needs Review 3 | Supplier Radius (Miles) No Limits | Freight Factor: 15.0% | Truck Fill % Estimate: Select a truck |
| ⦿ No Match 0 | | | |

⬇ Export  🔍 Find Suppliers

≡ Estimate Summary — 1106
Total items (17)
Market Price Estimate: — — $16,652.18
Freight Estimate: — — — — $293.75
Estimate Total: — — — — $16,945.93

Please select how you would like to fulfill your list

Only rows where the product/size have been mapped to our data and appear green are able to be matched to a supplier. You have 0 rows (0.00%) eligible to be matched to suppliers.

Method 1
Auto-Fulfill
Let LandscapeHub find suppliers to fulfill your list
Use for all eligible rows?
○ Yes  ○ No

[ Match Suppliers ]

Method 2
My Favorite Suppliers
Fulfill your list with your favorite suppliers Use for all eligible rows?
○ Yes  ○ No

[ Use Favorite Suppliers ]
[ View Favorite Suppliers ]

Method 3
Select Single Supplier
Choose a supplier to fulfill your list

[ Search by supplier name ]
[ Select ]

| | Product Name | | Package/Size | | Quantity | | Supplier | | Supplier Price | Estimat |
|---|---|---|---|---|---|---|---|---|---|---|
| ⋮⋮⋮ | ☐ | Acer miyabei 'State Street' ✓Confirmed ▽ | 3" | ⊙Matched ▽ | 2 | ▪▪▷ | Choose a Supplier | ▷ | $ 0.00 | $382.50 |
| ⋮⋮⋮ | ☐ | Liriodendron tulipifera ✓Confirmed ▽ | 3" | ⊙Matched ▽ | 3 | ▪▪▷ | Fiore - Chicago | ▷ | $ 318.75 | $270.50 |
| ⋮⋮⋮ | ☐ | Ulmus 'Morton' ✓Confirmed ▽ | 4" | ⊙Matched ▽ | 3 | ▪▪▷ | Choose a Supplier | ▷ | $ 0.00 | $310.00 |
| ⋮⋮⋮ | ☐ | Ulmus 'Morton Glossy' ✓Confirmed ▽ | 4" | ⊙Matched ▽ | 6 | ▪▪▷ | Choose a Supplier | ▷ | $ 0.00 | $355.00 |
| ⋮⋮⋮ | ☐ | Amelancheir canadensis 'Aut... ⊙Matched ▽ | 5' | ⊙Matched ▽ | 3 | ▪▪▷ | Fiore - Chicago | ▷ | $ 140.25 | $128.00 |
| ⋮⋮⋮ | ☐ | Continus coggygria 'Grace' ⊙Matched ▽ | 6' | ⊙Matched ▽ | 2 | ▪▪▷ | Choose a Supplier | ▷ | $ 0.00 | $0.00 |
| ⋮⋮⋮ | ☐ | Syringa reticulata 'Ivory Silk' ✓Confirmed ▽ | 2.5" | ⊙Matched ▽ | 1 | ▪▪▷ | Choose a Supplier | ▷ | $ 0.00 | $242.50 |
| ⋮⋮⋮ | ☐ | Diervilla lonicera ' Copper' ✓Confirmed ▽ | #3" | ⊙Needs Review ▽ | 11 | ▪▪▷ | Choose a Supplier | ▷ | $ 0.00 | $0.00 |
| ⋮⋮⋮ | ☐ | Euonymus alatus 'Coles Co... ⊙Matched ▽ | 36" | ⊙Matched ▽ | 106 | ▪▪▷ | Fiore - Chicago | ▷ | $ 0.00 | $47.50 |
| ⋮⋮⋮ | ☐ | Hydrangea panicualta "Limeli... ⊙Matched ▽ | #5 | ⊙Matched ▽ | 30 | ▪▪▷ | Fiore - Chicago | ▷ | $ 28.05 | $26.00 |
| ⋮⋮⋮ | ☐ | Hydrangea quercifolia 'Sno... ✓Confirmed ▽ | #5 | ⊙Matched ▽ | 9 | ▪▪▷ | Fiore - Chicago | ▷ | $ 38.89 | $28.00 |
| ⋮⋮⋮ | ☐ | Spiraea japonica 'Anthony... ✓Confirmed ▽ | #3 | ⊙Matched ▽ | 8 | ▪▪▷ | Fiore - Chicago | ▷ | $ 15.73 | $15.73 |
| ⋮⋮⋮ | ☐ | Syringa patula 'Miss Kim' ✓Confirmed ▽ | 36" | ⊙Matched ▽ | 33 | ▪▪▷ | Choose a Supplier | ▷ | $ 0.00 | $42.00 |
| ⋮⋮⋮ | ☐ | Viburnum dentatum 'Christ... ✓Confirmed ▽ | 36" | ⊙Matched ▽ | 41 | ▪▪▷ | Choose a Supplier | ▷ | $ 0.00 | $28.50 |
| ⋮⋮⋮ | ☐ | Taxus x media 'Everlow' ✓Confirmed ▽ | 18" | ⊙Matched ▽ | 31 | ▪▪▷ | Choose a Supplier | ▷ | $ 0.00 | $44.00 |
| ⋮⋮⋮ | ☐ | Hosta x 'Halcyon' ✓Confirmed ▽ | #1 | ⊙Matched ▽ | 42 | ▪▪▷ | Fiore - Chicago | ▷ | $ 7.65 | $5.75 |
| ⋮⋮⋮ | ☐ | Pennisetum alopecuroides... ✓Confirmed ▽ | #1 | ⊙Matched ▽ | 15 | ▪▪▷ | Fiore - Chicago | ▷ | $ 7.69 | $6.05 |
| ⋮⋮⋮ | ☐ | Allium x 'Summer Beauty' ✓Confirmed ▽ | #1 | ⊙Matched ▽ | 62 | ▪▪▷ | Twixwood Nursery | ▷ | $ 5.00 | $5.00 |
| ⋮⋮⋮ | ☐ | Nepta x faassenii 'Blue Won... ⊙Matched ▽ | #1 | ⊙Matched ▽ | 58 | ▪▪▷ | Mariani Plants - Garden Pr... | ▷ | $ 4.10 | $4.33 |
| ⋮⋮⋮ | ☐ | Rudbeckia hirta ✓Confirmed ▽ | #1 | ⊙Matched ▽ | 22 | ▪▪▷ | Twixwood Nursery | ▷ | $ 6.50 | $6.50 |
| ⋮⋮⋮ | ☐ | Calamintha nepeta ssp. ne... ✓Confirmed ▽ | #1 | ⊙Matched ▽ | 22 | ▪▪▷ | Fiore - Chicago | ▷ | $ 6.76 | $5.13 |

| landscape hub | | | | | | Hello, Chad ▽ | Zelda homes 🛒 Cart 7 |
|---|---|---|---|---|---|---|---|
| ‹Back \| Home› HubSheets› zelda homes | | | | | | | |
| zelda homes ✱ | | | | | | ⬆ Export | 🔍 Find Suppliers |

| Product Matching | Location ✎ | Freight ✎ | Truck Fill ✎ | 📄 Estimate Summary 🛒 Cart Summary |
|---|---|---|---|---|
| ◉ Matched/Confirmed ▓ 21 | Postal Code 60613 | Estimated Freight: $293.75 | Truck Type: None Selected | Items Added to Cart (7)  View or Edit Cart |
| ◉ Needs Review ▓ 3 | Supplier Radius (miles) No Limits | Freight Factor: 15.0% | Truck Fill % Estimate: Select a truck | Subtotal: .......... $3,451.93 |
| ◉ No Match ▓ 3 | | | | Freight Cost:...... 1530  $71.98 |
| | | | | Total  $3,523.91 |

| ☐ | Product Name | Package/Size | Quantity | Supplier | Supplier Price | Estimated U |
|---|---|---|---|---|---|---|
| ⋮⋮⋮ ☐ | Acer miyabei 'State Street' | ✓Confirmed ▸ 3" | ⦿Matched ▸ 2 | ▸ Choose a Supplier | $ ▸ | 0.00 $382.50 |
| ⋮⋮⋮ ⊠ | Liriodendron tulipifera | ✓Confirmed ▸ 3" | ⦿Matched ▸ 3 | ▸ Flore - Chicago | $ ▸ | 318.75 $270.50 |
| ⋮⋮⋮ ☐ | Ulmus 'Morton' | ✓Confirmed ▸ 4" | ⦿Matched ▸ 3 | ▸ Choose a Supplier | $ ▸ | 0.00 $310.00 |
| ⋮⋮⋮ ☐ | Ulmus 'Morton Glossy' | ✓Confirmed ▸ 4" | ⦿Matched ▸ 6 | ▸ Choose a Supplier | $ ▸ | 0.00 $355.00 |
| ⋮⋮⋮ ⊠ | Amelanchier canadensis 'Aut... | ⦿Matched ▸ 5 | ⦿Matched ▸ 3 | ▸ Flore - Chicago | $ ▸ | 140.25 $128.00 |
| ⋮⋮⋮ ☐ | Cotinus coggygria 'Grace' | ⦿Matched ▸ 6' | ⦿Matched ▸ 2 | ▸ Choose a Supplier | $ ▸ | 0.00 $0.00 |

| Search for products | | Suppliers | Plants | Hard Goods | Hello, Chad ▽ | zelda homes 🛒 Cart (7) |
|---|---|---|---|---|---|---|
| 🔍 Search | | | | | | |

Note: These 50 will be coming In-Lead Times Vary(LandscapeHub will confirm Lead Time)

☐ Hosta 'Halcyon'
Halcyon Hosta
SKU:GG47C5C9-3D39
1 Container          $7.65          42          $321.30
Note: These 72 will be coming In-Lead Times Vary(LandscapeHub will confirm Lead Time)

☐ Pennisetum alopecuroides 'Hameln'
Hameln Dwarf Fountain Grass
SKU:GG49415D-F770
1 Container          $7.69          15          $115.35
Note: These 378 will be comig In-Lead Times Vary(LandscapeHub will confirm Lead Time)

SUPPLIER INFORMATION
Fiore-Chicago
Fiore-Chicago
2901 W.Ferdinand ST
Chicago, IL 60612

ORDER SUMMERY
Subtotal:              $3,131.00
Estimated Tax:          $320.94
Subtotal w/ Tax:      $3,451.94

Add a note for this supplier    <u>1630</u>

FULFILLMENT INFORMATION             *denotes required fields
Fulfillment Type*
⦿ Pickup    ○ Delivery Time of Day
○ AM  ○ PM  ⦿ Either Pickup Date
10/30/2020

How would you like to pay?
⦿ Trade Credit
○ Electronic Check (COD)
○ Credit Card (COD)

PICKUP INFORMATION
This order is to be picked up from:
Fiore-Chicago
2901 W.Ferdinand St.
Chicago,IL 60612

FIG. 16 landscape⊗hub | Search for products | Search | Suppliers  Plants  Hard Goods | Hello, Chad ▽ | 🛒 Cart (6)

Start Quote
Place an Order
Create a Hubsheet

Tools
- Home
- Search
- Orders
- Quotes
- HubSheets

Settings
- My Profile
- Company Profile
- Favorite Suppliers

Quote submitted!
Quote Name | Quote #
Zelda homes | 3000058

1830

WHAT HAPPENS NEXT ☺
Our team will review your orders and get confirmation from your suppliers. Once your orders are confirmed we'll contact you with the final order details. If any of your orders are for delivery, we'll also work out the shipping details.

It looks like you've checked out with a payment method we don't have on file for your company. To provide LandscapeHub with your payment information, click here.

Please note that orders submitted with unapproved payment methods may not be sent to the supplier for fulfillment until we have a payment method on file, so if you need this order quickly, feel free to call us at (312) 601-9986 and we'll be happy to assist you.

If you have any questions about your quote or would like to make further adjustments, please Contact Us. You can review your order(s) status from your "Quotes" page or use this link.

[Create a New Quote]  [Back to Home Page]

Quote summary
Here's a summary of the orders that have been created from your quote. You should be receive an email receipt that has the full details.

| Order # | Supplier | Details | Fulfillment | Expected | Order Total |
|---|---|---|---|---|---|
| 1003774 | 〰〰〰 | 7 SKUs (110 items) | Pickup | Expected on 10/30/2020 | $3,131.00 |

FIG. 18

FIG. 19 landscape hub — OSU Tennis Facility (In Progress) — Hello, Chad | New Cart

< Exit | Home > HubSheets > OSU Tennis Facility

Job Details
Postal Code: 60613
Supplier Radius (Miles): 100 Miles
Anticipated Job Date: 10/15/2021

Freight
Estimated Freight: $0.00
Freight Factor: 0.00%

Truck Fill
Truck Type: None Selected
Truck Fill % Estimates: Select a Truck

Estimate Summary
Total Items (17)
Market Price Estimate: $5,652.30
Freight Estimate: $0.00
Estimate Total: $5,652.30

Suppliers — Assign Suppliers ↓ Export Sheet

2030 — Smart Cells adjust automatically based on user preferences

| ☐ Product Name | | Package/Size | | Quantity | Estimated Unit Price ⓘ | | Budgeted Price | %Diff | Truck Fill | Notes | notes |
|---|---|---|---|---|---|---|---|---|---|---|---|
| ☐ Acer miyabei 'State Street' | ●Match▷ | 3" B&B | ●Match▷ | 10 | $284.55 | Market Price▷ | $310.20 | 8.27% | | Notes | Straight trunk |
| ☐ Tulip tree | ●Match▷ | 3" B&B | ●Match▷ | 5 | $310.50 | Market Price▷ | $240.00 | (29.38%) | | Notes | |
| ☐ PxA bloodgood | ●Match▷ | 2 1/2" B&B | ●Match▷ | 1 | $0.00 | ▷ | $400.00 | | | Notes | |
| ☐ Diervilla lonicera 'Copper' | ●Match▷ | #3 Container | ●Match▷ | 2 | $0.00 | | $16.00 | | | Notes | |
| ☐ Euonymus alatus 'Coles...' | ●Match▷ | 36" B&B | ●Match▷ | 10 | $54.50 | Market Price▷ | $45.00 | (21.11%) | | Notes | |
| ☐ HP Limelight | ○Needs Review▷ | #5 | ○Needs Review▷ | 10 | $0.00 | | $20.00 | | | Notes | |
| ☐ HQ Snowqueen | ●Match▷ | #5 | ○Needs Review▷ | 4 | $0.00 | | $32.00 | | | Notes | |
| ☐ Spiraea japonica 'Anthon...' | ●Match▷ | #3 Container | ●Match▷ | 23 | $18.00 | Market Price▷ | $16.75 | (7.46%) | | Notes | |

FIG. 20

FIG. 21 landscapehub OSU Tennis Facility (In Progress) ✱ [Hello, Chad ▽] | [🛒 New Cart]

< Exit  Home>HubSheets>OSU Tennis Fcility  2230

| Job Details ✎ | Freight ✎ | Truck Fill ✎ | ≡ Estimate Summary |
|---|---|---|---|
| Postal Code<br>60613 | Estimated Freight:<br>$678.02 | Truck Type:<br>48ft Flatbed | Total items (17)<br>Market Price Estimate: $5,652.30 |
| Supplier Radius(Miles)<br>100 miles | Freight Factor:<br>12.0% | Truck Fill % Estimates:<br>47.28% ✓ | Freight Estimate: $678.00 |
| Anticipated Job Date<br>10/15/2021 | | | Estimate Total: $6,330.32 |

Suppliers ⊂⊃  ⟳ Assign Suppliers  ⬆Export Sheets

| | Product Name | Package/Size | Quantity | Estimated Unit Price ⓘ | Budgeted Price | %Diff | Estimated Freight | Truck Fill | Notes |
|---|---|---|---|---|---|---|---|---|---|
| ⋮⋮⋮ ☐ | Acer miyabei 'State Str... | ⊙Match ▽ 3" B&B | ⊙Match ▽ 10 | ⊙Market Price ▽ $284.55 | $310.20 | (8.27%) | $34.15 | 25.88% | Notes |
| ⋮⋮⋮ ☐ | Tulip tree | ⊙Match ▽ 3" B&B | ⊙Match ▽ 5 | ⊙Market Price ▽ $310.50 | $240.00 | (29.38%) | $37.26 | 12.94% | Notes |
| ⋮⋮⋮ ☐ | PxA bloodgood | ⊙Match ▽ 2 1/2" B&B | ⊙Match ▽ 1 | ▽ $0.00 | $400.00 | | | 1.8% | Notes |
| ⋮⋮⋮ ☐ | Diervilla lonicera 'Copp.. | ⊙Match ▽ #3" Container | ⊙Match ▽ 2 | ▽ $0.00 | $16.00 | | | 0.15% | Notes |

FIG. 22

FIG. 24 landscapehub — OSU Tennis Facility (In Progress) — Hello, JimSep30a ▽ | 🛒 New Cart < Exit  Home>HubSheets>OSU Tennis Fcility

| Job Details | Freight | Truck Fill |
|---|---|---|
| Postal Code 60613<br>Supplier Radius(Miles) 100 Limits<br>Anticipated Job Date 10/15/2021 | Estimated Freight: $0.00<br>Freight Factor: 0.0% | Truck Type: None Selected<br>Truck Fill % Estimates: Select a truck |

2500

Estimate Summary
Total items (17)
Market Price Estimate: — — — $5,652.30
Freight Estimate: — — — — $0.00
Estimate Total: $5,652.30

Suppliers ⊙  ⟲ Assign Suppliers  ⬆ Export Sheets

| ☐ | Product Name | | Package/Size | | Quantity | Estimated Unit Price ⓘ | | Budgeted Price | %Diff | Truck Fill | Notes | PartnetList-ItemId |
|---|---|---|---|---|---|---|---|---|---|---|---|---|
| ☐ | Acer miyabei 'State Str... | ⊙ Match ▽ | 3" B&B | ⊙ Match ▽ | 1 | $277.00 | ⊙ Market Price▽ | $271.50 | (2.03%) | | Notes | 1234 |
| ☐ | Tulip tree | ⊙ Match ▽ | 3" B&B | ⊙ Match ▽ | 1 | $258.50 | ⊙ Market Price▽ | $240.00 | (7.71%) | | Notes | 1235 | TREEACERM
| ☐ | PxA bloodgood | ⊙ Match ▽ | 2 1/2" B&B | ⊙ Match ▽ | 1 | $358.31 | ⊙ Market Price▽ | $400.00 | 10.42% | | Notes | TREEPABG |
| ☐ | Diervilla lonicera 'Copp... | ⊙ Match ▽ | #3 Container | ⊙ Match ▽ | 2 | $14.85 | ▽ | $16.00 | 7.19% | | Notes | |
| ☐ | Euonymus alatus 'Cole... | ⊙ Match ▽ | 36" B&B | ⊙ Match ▽ | 10 | $42.25 | ⊙ Market Price▽ | $45.00 | 6.11% | | Notes | |
| ☐ | HP Limelight | ⊙ Needs Review ▽ | #5 | ⊙ Needs Review ▽ | 10 | $0.00 | ▽ | $20.00 | | | Notes | |
| ☐ | HQ Snowqueen | ⊙ Match ▽ | #5 | ⊙ Match ▽ | 4 | $0.00 | ▽ | $32.00 | | | Notes | |
| ☐ | Spiraea japonica 'Anth... | ⊙ Match ▽ | #3 Container | ⊙ Match ▽ | 8 | $17.00 | ⊙ Market Price▽ | $16.75 | (1.49%) | | Notes | |
| ☐ | Korean Lilac | ⊙ Match ▽ | #3 Container | ⊙ Match ▽ | 2 | $14.50 | ⊙ Market Price▽ | $10.00 | (45%) | | Notes | |
| ☐ | Halcyon Hosta | ⊙ Match ▽ | #1 Container | ⊙ Match ▽ | 10 | $7.55 | ⊙ Market Price▽ | $10.00 | 24.50% | | Notes | |

FIG. 25

METHODS AND SYSTEMS FOR PROCESSING PRODUCTS LISTED IN A LANDSCAPING PROJECT

RELATED APPLICATION

The present application is a national stage entry of PCT International Patent Application No. PCT/US2021/057596, entitled "METHODS AND SYSTEMS FOR PROCESSING PRODUCTS LISTED IN A LANDSCAPING PROJECT", filed on Nov. 1, 2021, which claims the benefit of priority under 35 U.S.C. § 119 from U.S. Provisional Patent Application Ser. No. 63/107,844 entitled "METHODS AND SYSTEMS FOR PROCESSING PRODUCTS LISTED IN A LANDSCAPING PROJECT," filed on Oct. 30, 2020, the disclosure of which are hereby incorporated by reference in their entireties for all purposes.

TECHNICAL FIELD

The present disclosure generally relates to landscaping project management systems, and more specifically relates to methods and systems for processing products listed in a landscaping project.

BACKGROUND

The Landscape Industry is comprised of around 100 billion in annual revenues with a growth rate of about 4.5% year over year. There are currently around 450,000 different businesses serving this industry. Designers of landscape projects often spend countless hours searching for new interesting materials to bring their clients who may rely on past relationship or past effort to find products for their designs and then pass that information along to the installing contractors. Many of these firms work with past long tenured relationships where they are not under competitive bid pressure to increase the margins in some instances.

SUMMARY

In an example, a computer implemented method for processing products listed in a landscaping project is disclosed. The method includes: executing by at least a processor in a server, program code stored in a non-transitory computer-readable medium, wherein the executed program code cause the server to perform at least the following steps: (a) collecting and capturing from a client device, open format raw data of a material list in a received file; (b) translating the captured open format raw data of the material list into text format data; (c) mapping the text format data to a master product database to generate a matched material list with associated procurement information for each item on the matched material list; (d) generating a smart spreadsheet of the matched material list, includes an array of smart cells, wherein the itemized plant names or landscaping supplies are displayed as contents in a designated column or row of the smart cells, and the associated procurement information are displayed in respective smart cells arranged in row or column corresponding to each respective plant name or landscape supply, wherein at least one smart cell in the array that corresponds to a particular itemized plant name or landscaping supply is configured to display a match indicator that indicates a degree of matching of its content to a target value; (e) when the degree of matching of the content indicates less than the target value, adjusting the match indicator corresponding to the at least one smart cell to a desired range value for a search of a substitute in the master product database; (f) forwarding to the client device, the smart spreadsheet for user's selections or modifications to the contents in the smart cells according to user's preference; (g) in response to a user's preference input from the user device to modify the content of at least one smart cell, updating the spread sheet; and (h) displaying on the user device, a total cost estimate for bidding or for procurement of at least a portion of the products for the landscaping project.

In an example, a computer algorithm includes program code stored in a non-transitory computer-readable medium is disclosed. The program code are executable by at least a processor in a server for processing products listed in a landscaping project, the computer algorithm, includes at least the following functional sections: (1) a collector code section, executable to perform: collecting and capturing from a client device, open format raw data of a material list in a received file; and translating the captured open format raw data of the material list into text format data; (2) a builder code section, executable to perform: mapping the text format data to a master product database to generate a matched material list with associated procurement information for each item on the matched material list; (3) a smart spreadsheet code section, executable to perform: generating a smart spreadsheet, includes an array of smart cells, wherein the itemized plant names or landscaping supplies are displayed as contents in a designated column or row of the smart cells, and the associated procurement information is displayed in respective smart cells arranged in row or column corresponding to each respective plant name or landscape supply, wherein at least one smart cell in the array that corresponds to a particular itemized plant name or landscaping supply is configured to display a match indicator that indicates a degree of matching of its content to a target value; and (4) an interactive tool code section, executable to perform: when a degree of matching of the content indicates less than the target value, adjusting the match indicator corresponding to the at least one smart cell to a desired range value for a search of a substitute in the master product database; forwarding to the client device, the smart spreadsheet for user's selections or modifications to the contents in the smart cells according to user's preference; in response to a user's preference input from the user device to modify the content of at least one smart cell, updating the spread sheet; and displaying on the user device, a total cost estimate for bidding or for procurement of at least a portion of the products for the landscaping project.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 1 is an example of an algorithm uploading open format raw data from a material list.

FIG. 2 is an example of the algorithm permitting translation of the captured data for matching to a master product database.

FIG. 5 is an example of smart cells configured with functionality to enable jobs and materials management.

FIG. 6 is an example of interactive smart cells displaying color coded match indicator functions.

FIG. 7 is an example of an interactive smart cell configured with a popped up mini application.

FIGS. 8A-8C are examples of an interactive smart cell displaying content information package size.

FIG. 9 is a typical view of a spread sheet generated for a landscape job.

FIG. 10 is a typical view of a spread sheet showing a location of tools.

FIG. 11 illustrates a supplier's tool performing searches for a landscape job.

FIG. 12 is an example of manually overriding tool results.

FIGS. 13-18 are steps to order selected items for a landscape job.

FIG. 19 is an example of customizing the smart spreadsheet with user preferences for a landscape job.

FIG. 20 is an example of configuring a tool to automatically adjust contents of the smart cell based on user preferences.

FIG. 21 is an example of a tool exporting the data in the smart spreadsheet.

FIG. 22 is an example of a tool estimating freight cost for a landscape job.

FIGS. 23-25 are examples of raw data of a user's material list from a third-party system are imported, translated and matched via a one-click API.

DETAILED DESCRIPTION

To facilitate understanding of the disclosure, certain description of the drawings may be out-of-sequence or referenced to multiple drawings to describe similar embodiments and their variations.

The present disclosure provides an algorithm that solves multiple challenges in the landscape industry through providing the following: finding suitable products through a deep network of suppliers with multiple sources, increase of plant pallet based on availability, reduce time to secure material, eliminate need of product having to be maintained at job site, arrange buying power with suppliers with credits and reduce lost time to finish the landscaping projects.

The algorithm offers features to meet the purchasing and management needs so that landscaping professionals may focus on growing their business by spending more time retaining current clients and developing new relationships with future clients. In addition, the algorithm utilizes a dedicated Application Programming Interface (API) to integrate directly with various enterprise resource planning (ERP) and POS/Inventory Management Software Systems. Through "one click" on the API, a spread sheet is being prepared by the algorithm to help different businesses to manage functions, such as sales or bidding jobs, materials procurement, scheduling their crews or accounting function, to name a few.

Throughout the description, it should be noted that the term "smart spreadsheet" should not be construed as a regular spreadsheet which merely displays contents in cells which are arranged in an array with rows and columns. Instead, the term "smart spreadsheet" formed by at least a plurality of "smart cells" within the array. Each of the "smart cells" may be embedded with a mini application which may be capable of performing specific tasks in response to user's manual input such as clicking on the smart cell to invoke and execute the mini application. In implementation, a portion or all of the "smart cells" may be configured to perform tasks automatically based on a set of default parameters or may be defined by the user using "tools" functions on the "smart spreadsheet". In another implementation, the mini application in the "smart cells" may perform tasks automatically based on machine learning through artificial intelligence (AI), which user's historic selections may be stored into a database which may be used to train a machine learning algorithm to optimize future decisions or recommendations for the user or for other users for best price, matched plants or alternatives, preferred suppliers, shortened delivery schedule, shipping methods, price data, and seasonal supplies forecast, to name a few.

Figure 28A:
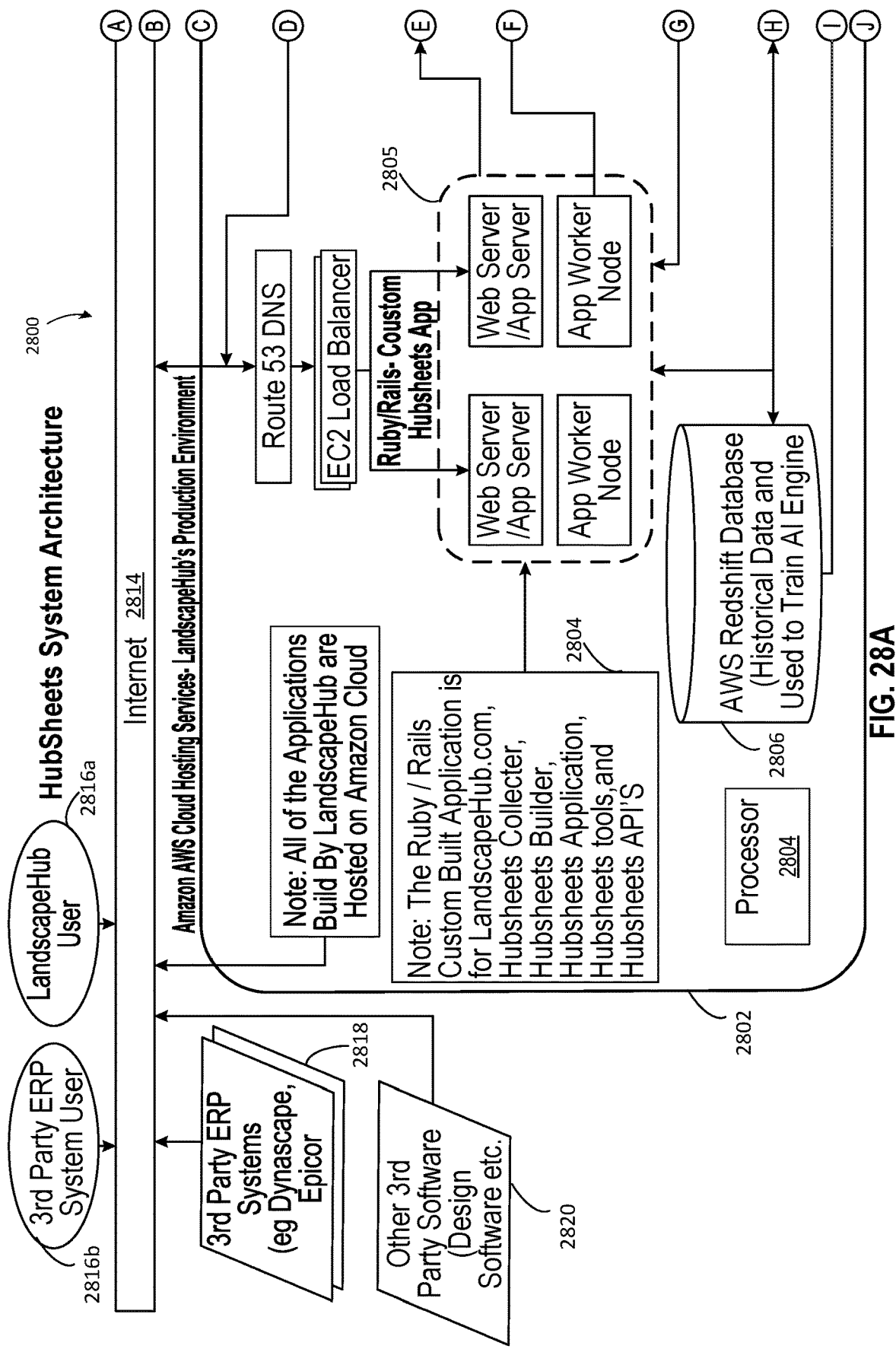
FIGS. 28A-28B is an example of a system for processing products listed in a landscaping project.
Figure 28B:
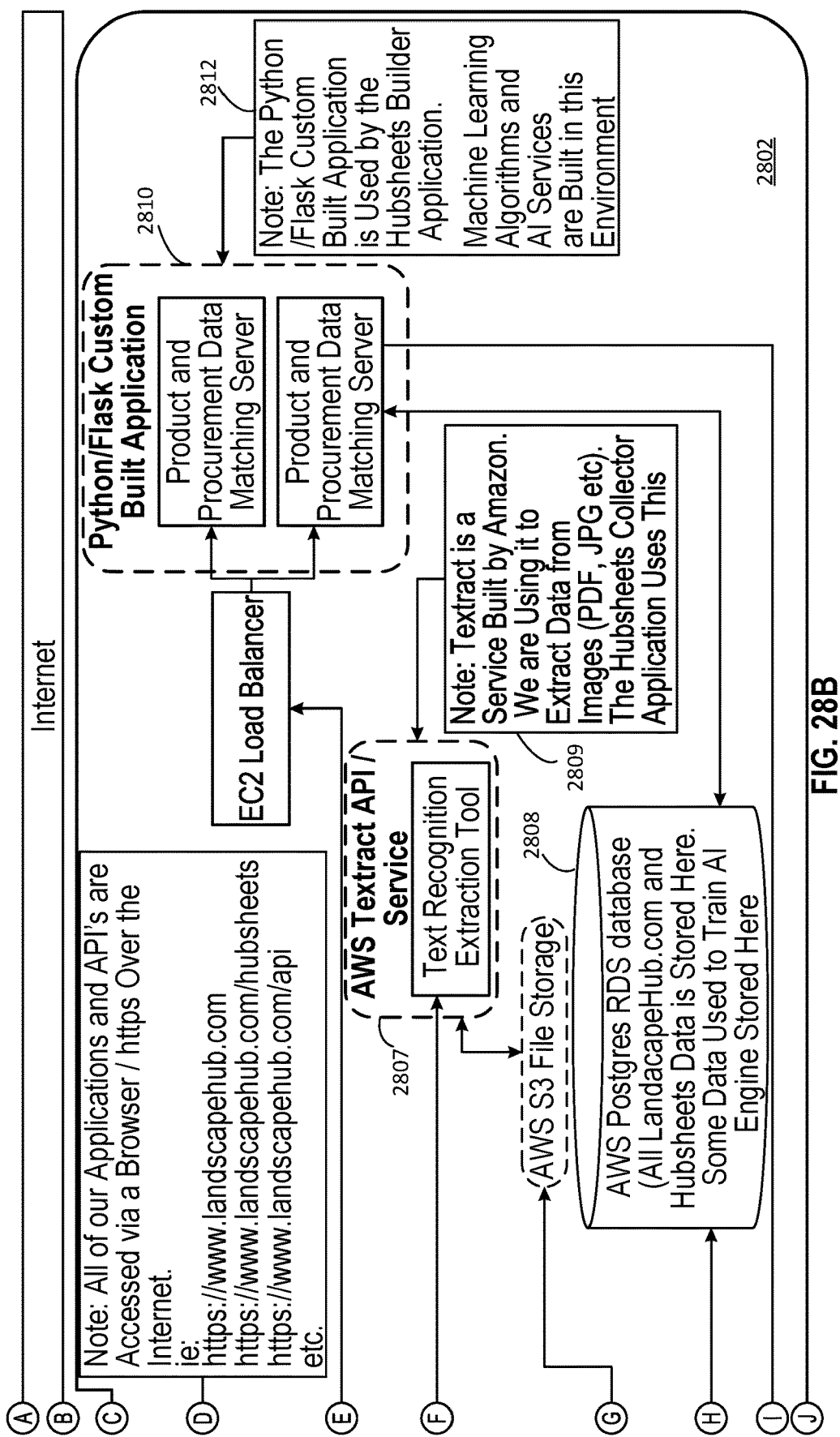

FIGS. 27A-27D is a detailed process flow diagram of a computer implemented method (2700) for processing products listed in a landscaping project. FIGS. 28A-28B is an example of a system (2800) for processing products listed in a landscaping project. More specifically, the products listed refer to the plants or supplies in a material list which a user may be looking to bid for a landscaping project or to purchase for a landscaping project. Multiple users' scenarios are supported that aren't displayed in this flow diagram.

In an example, the method (2700) includes: executing by at least a processor (see 2804 in FIG. 28A) in a server (2802), program code (2804) or applications (2805) stored in a non-transitory computer-readable medium (i.e., computer memory), wherein the executed program code (2804) cause the server (2802) to perform the following steps: (a) collecting and capturing (see Collector in steps 2702 to 2714) from a client device (2816a or 2816b), open format raw data of a material list in a received file (see 102-110 in FIG. 1); (b) translating (see step 2716 in FIG. 27A, see service 2807, 2809 in FIG. 28B) the captured open format raw data of the material list into text format data; (c) mapping (see Builder in FIG. 27B, steps 2718-2726) the text format data to a master product database (2806 or 2808) to generate a matched material list with associated procurement information for each item on the matched material list; (d) generating a smart spreadsheet of the matched material list (see FIG. 27C Hubsheet, i.e., smart spreadsheets 300 and 600 in FIGS. 3, 6), including an array of smart cells (302, 304, 306, 308 in FIG. 3), wherein the itemized plant names or landscaping supplies (302) are displayed as contents (301) in a designated column (302) or row of the smart cells, and the associated procurement information (304, 306, 308) are displayed in respective smart cells (304a, 306a, 308a) arranged in row or column corresponding to each respective plant name or landscape supply, wherein at least one smart cell (e.g., 302a, 602a) in the array that corresponds to a particular itemized plant name or landscaping supply is configured to display a match indicator (e.g., 310, 610) that indicates a degree of matching of its content to a target value; (e) when a degree of matching of the content indicates less than the target value, adjusting the match indicator (310, 610) corresponding to the at least one smart cell (302a, 602a) to a desired range value for a search of a substitute in the master product database (2806 or 2808); (f) forwarding (see step 2728) to the client device (2816a or 2816b), the smart spreadsheet 300 for user's selections or modifications (step 2732) to the contents in the smart cells (302, 602) according to user's preference (see step 2730); (g) in response to a user's preference input (step 2732) from the user device to modify the content of at least one smart cell (see step 2732), updating the spread sheet (300); and (h) displaying (see step 2738) on the user device, the spread sheet 300 including a total cost estimate (308) for bidding (step 2734) or for procurement (step 2736) of at least a portion of the products (302*a* to 302*x*) for the landscaping project.

In another example (see FIGS. 3, 6), the smart spreadsheet (600) of matched material list may include one or both of: itemized plant names or landscaping supplies (see 302, 602), and the associated procurement information includes one or a combination of: plant size or product size (304, 604), packaging or container sizes, units per package or per container (304, 604), unit price or per package price (308, 608), total or budget price (610), brands or suppliers information, availability and location of each items.

In another example, the server (2802) may communicate through a network (2804) with the client device (2816*a* or 2816*b*) using an integrated Application Program Interface (API) (2804) which interacts with a third party enterprise system (ERP) (2818) to establish a secured session with the client device (2816*a* or 2816*b*) for transmission of the material list and forwarding the spread sheet (600) to the client device (2816*a* or 2816*b*) of the matched material list with the associated procurement information including a cost estimate (308, 608) of the items (302, 602) in the matched material list to the client device.

In another example (see FIG. 1, FIG. 27A), the material list (2712, 2714) is directly imported through the API (2804) in its current format without conforming to a specific format standard, wherein the open format raw data in the material list includes one of: a word file, an Adobe pdf file, an Excel file, a comma separated values (CSV) file, an email file, a printed document, a handwritten note, a blueprint, a scanned image, a picture file and an audio file (102-110).

In implementation, the API (2804, 2807) interacts with a third party text translation software (2809) to translate the captured open format raw data into text format data by performing one of: (i) directly using text format data from the word file, CSV file, the email file, the Excel file or the printed document (steps 2712, 2726), (ii) using an image capturing software or an optical character recognition (OCR) software tool (2807, 2809) to translate captured image data from the handwritten note, the pdf file, the blueprint, the scanned image and the picture file into the text format data, and (iii) using a speech recognition software to transcribe the audio file into text format data (2807, 2809).

In an example (see FIG. 28B), the text format data are text string matched to the matched material list with associated procurement information using a database management system's text and query engine plus a code-based machine learning and AI libraries (2810, 2812) to match to the master product database (2806 or 2808). In another example, a postgres text engine and a python coded library (2810) may be used to match to the master product database (2806 or 2808).

In another example (see FIGS. 3, 6-8C), each smart cell is configured to unfurl to display detail information of the content in the smart cell through embedded program code or through a link to the master product database, and the desired range value in the match indicator is reflected through one or both of: a color code (e.g., green 100% matched, yellow 75% matched, red<50% matched) and an amount of filling within a circular bubble (e.g., filled, half filled, quarter filled).

In another example (see FIGS. 27D, 28A), the program code (2804) or applications (2805) includes a tools function (see step 2738) which may automatically adjust (see step 2738 optimization and AI block 2812) a portion of data in the smart cells according to the user preferences as procurement selection to achieve one or a combination of: better pricing, availability, distance from job site and favorite suppliers.

In another example (see FIGS. 19-20, 27C, 28A), the program code (2804) or applications (2805) includes a smart spreadsheet function (see step 2730) to carry out procurement selection, which includes manually selecting by the user or automatic selecting by the executed program code, of different suppliers or products listed in the smart spreadsheet, based on user's preferences and job data for the landscaping project.

In another example (see FIG. 23) the API (2804) may enable procurement of the at least a portion of the products listed from among the selected different suppliers in the smart spreadsheet may require only a single checkout (e.g., one-click checkout 2302) resulting in elimination of multiple checkouts from each respective supplier (also see step 2736).

In another example (see path M in FI. 27C, 27D), the program code (2804) or applications (2805) includes feeding back the content from at least a portion of the smart cells as artificial intelligence (AI) training (step 2738) to improve future procurement for the user.

In another example (see FIGS. 27C, D, 28A, B), the AI training includes using historical data of matched plant names or landscaping supplies in the master product database (2802) to update one or more of: product codes, unit price or quantity price breaks, availability, delivery schedule, shipping location, shipment cost, distance from job site, supplier's rating and customers' review and best matched alternatives of the items in the matched material list for the landscaping project.

In another example (see FIGS. 27C, D, 28A, B), the AI training further includes constantly polling or listening to suppliers' websites via a webhook event listener to update the master product database (2806 or 2808) on one or more of: product codes, unit price or quantity price breaks, availability, delivery schedule, shipping location, shipment cost, distance from job site, supplier's rating and customers' review and best matched alternatives of the items in the matched material list for the landscaping project.

In another example (see FIGS. 27C, D, 28A, B), once an order has been placed, the program code (2804) or applications (2805) may send event notifications to the user to update status of the landscaping project, wherein the event notifications may include one or a combination of: product or plants shipment status, delivery schedule, invoice and payment status The following description of FIGS. 1-26 may enable further understanding of the computer implemented methods for processing products listed in a landscaping project. References from other drawings may be referred to facilitate understanding.

FIG. 1 is an example of a "collector" code section (100) (also see FIG. 27A) of an algorithm for uploading open format raw data from a material list (102-112). The "collector" code section (100) of the algorithm may permit ingestion of a materials list in its current format without having to conform to a standard format, through which raw data from the uploaded material list are captured. The idea is to simplify ingestion of a materials list for processing with limited user input. In implementation, the "collector" code section (100) may be a mix of technology designed to work with the current format of a materials list for a job. If the materials list (102 to 106) data is in a formatted file, the "collector" code section (100) may allow an upload of that data without having to meet a standard. If the Job's materials list exists in a third party system (e.g., 2818. 2820 in FIG. 28A), an integrated API (2084) may ingest the data directly from that a third-party ERP system using only a one-click operation. If the materials list (108-112) is embedded in a blueprint, photo or other paper format, the collector code section 100 may directly ingest image formats (pdf, jpg etc.) with a simple wizard (2710).

FIG. 2 is an example of a "builder" code section (200) (also see FIG. 27B) of the algorithm permitting translation of the captured data for matching to a master product database (202, 204, 2806 or 2808). The builder code section (200) is the intelligent data engine of the system 2800. Data from the materials list (102-112) may be transformed, normalized and interpreted for insights within this piece of technology. In actual embodiment the builder code (200) is named as "Everglade". Database technologies, data libraries, machine learning algorithms and AI are used to simplify the ingesting of data, display of insights and Sheets Tools intelligence. The builder (200) may use data from many sources. A custom-built master list of products, packages and sizing may be used to normalize the materials list data. A database (202, 204, 2806 or 2808) of current and future product availability across a wide variety of suppliers is used to provide ordering, insights generation (ie market price) and tools specific functionality. A transactional (ordering) database is also utilized along with 3rd party open datasets.

Figure 3:
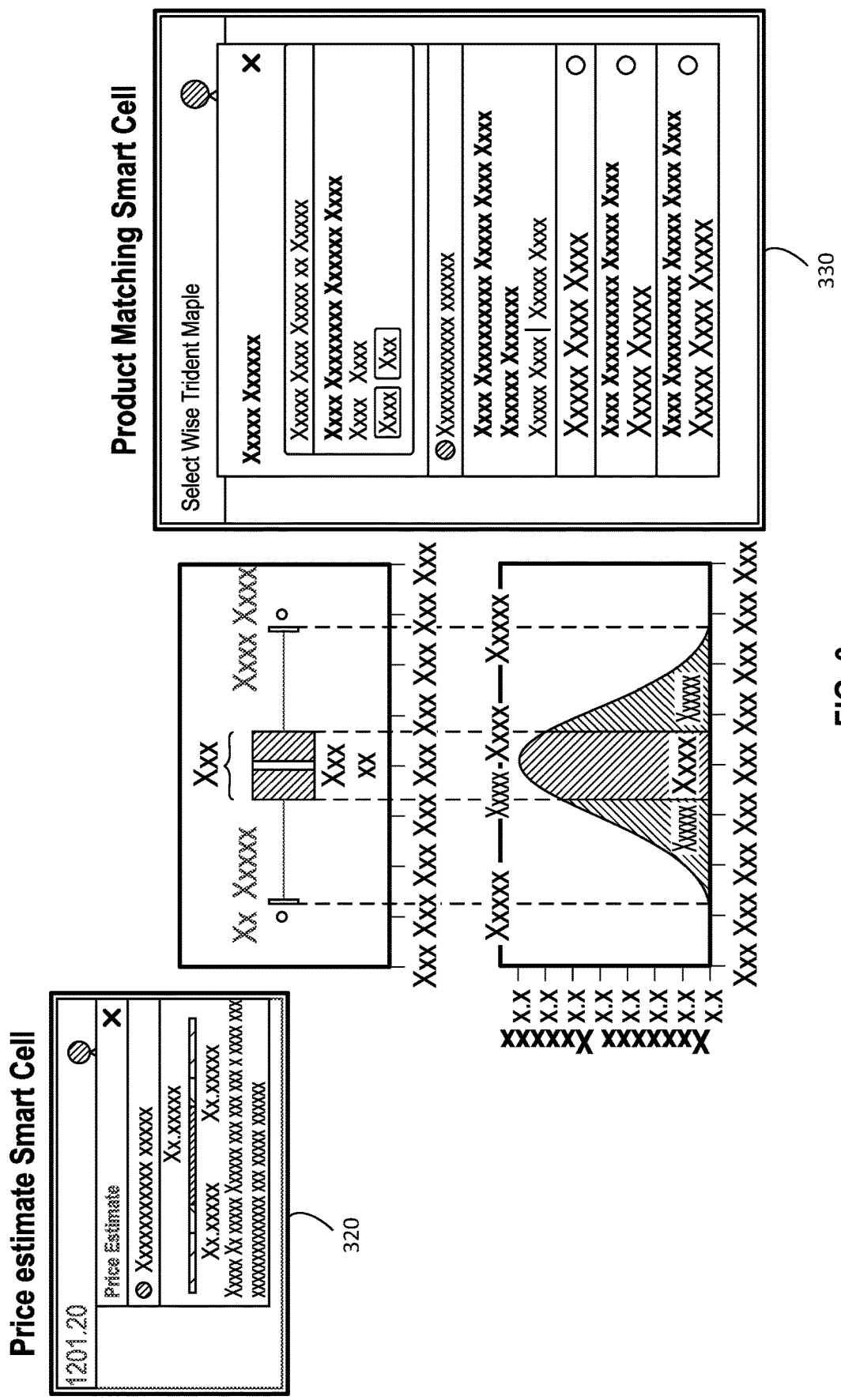
FIG. 3 is an exemplary generated smart spreadsheet including an array of smart cells displaying plant names or supplies and procurement information.

FIG. 3 is an exemplary generated smart spreadsheet (300) including an array of smart cells (302-308) arranged in respective rows and columns displaying plant names or supplies and procurement information. The smart spreadsheet (300) may include match indicators (310 to 316) which may indicate a range value of content displayed in the at least one smart cell that matches to a target goal. Furthermore, the smart spreadsheet (300) may be customized based on user preferences and contains insights, visualizations and mini-applications embedded within a cell (smart cells). Smart cells are integrated tightly with the builder code (200). Any manipulation of a Smart cell, may include communicating directly with the builder code section 200 for data and insights. In an example, the smart cell may include a price estimate smart cell (320) for estimating price and a product matching smart cell (330) for matching plant names or supplies.

Figure 4:
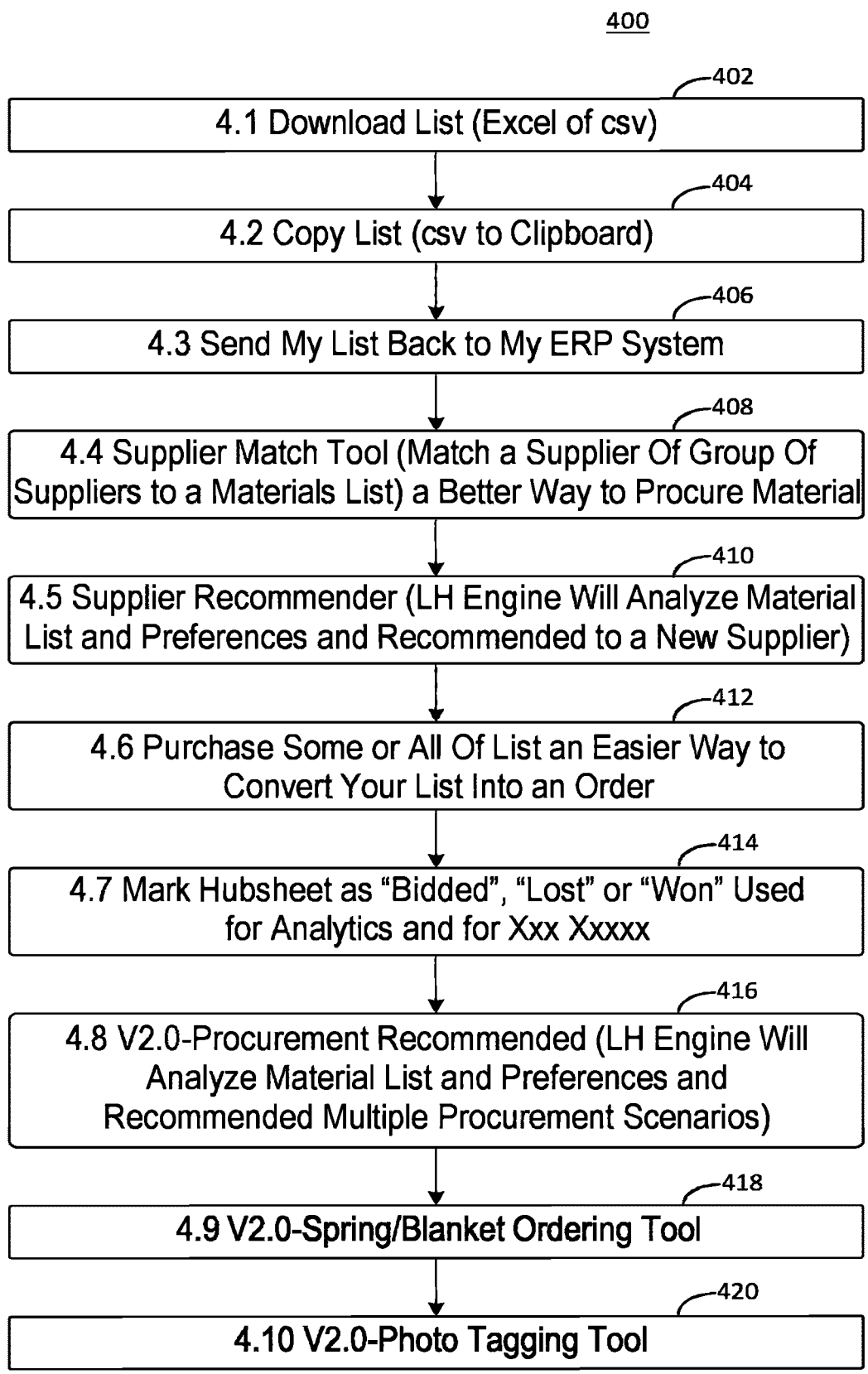
FIG. 4 is an example of a smart spreadsheet tool features to enable procurement selections.

FIG. 4 illustrates the algorithm possessing tool 400 features that allow a user of the system to accomplish tasks (by taking steps 402 to 420) related to their Hub Sheet data. Tools work with the data within the Hub Sheet, the algorithms within the Hub Sheet Builder and the vast datasets of the Builder. For example, a tool may be used to automatically select suppliers for your materials list and provide an optimized procurement scenario (see step 416). Tools 400 also allow a user to estimate, negotiate pricing with suppliers, and work directly with their 3rd party system they use to run their business. The combination of the Sheets Interface, the Sheets Tools (400) and the builder (200) allows for a user to effectively streamline their workflow.

FIG. 5 illustrates the functionality provided to allow a user the ability to manage their many jobs and corresponding materials lists. Summary information is provided for each Hub Sheet (i.e., smart spreadsheet) along with popular tools (502).

Figure 6:
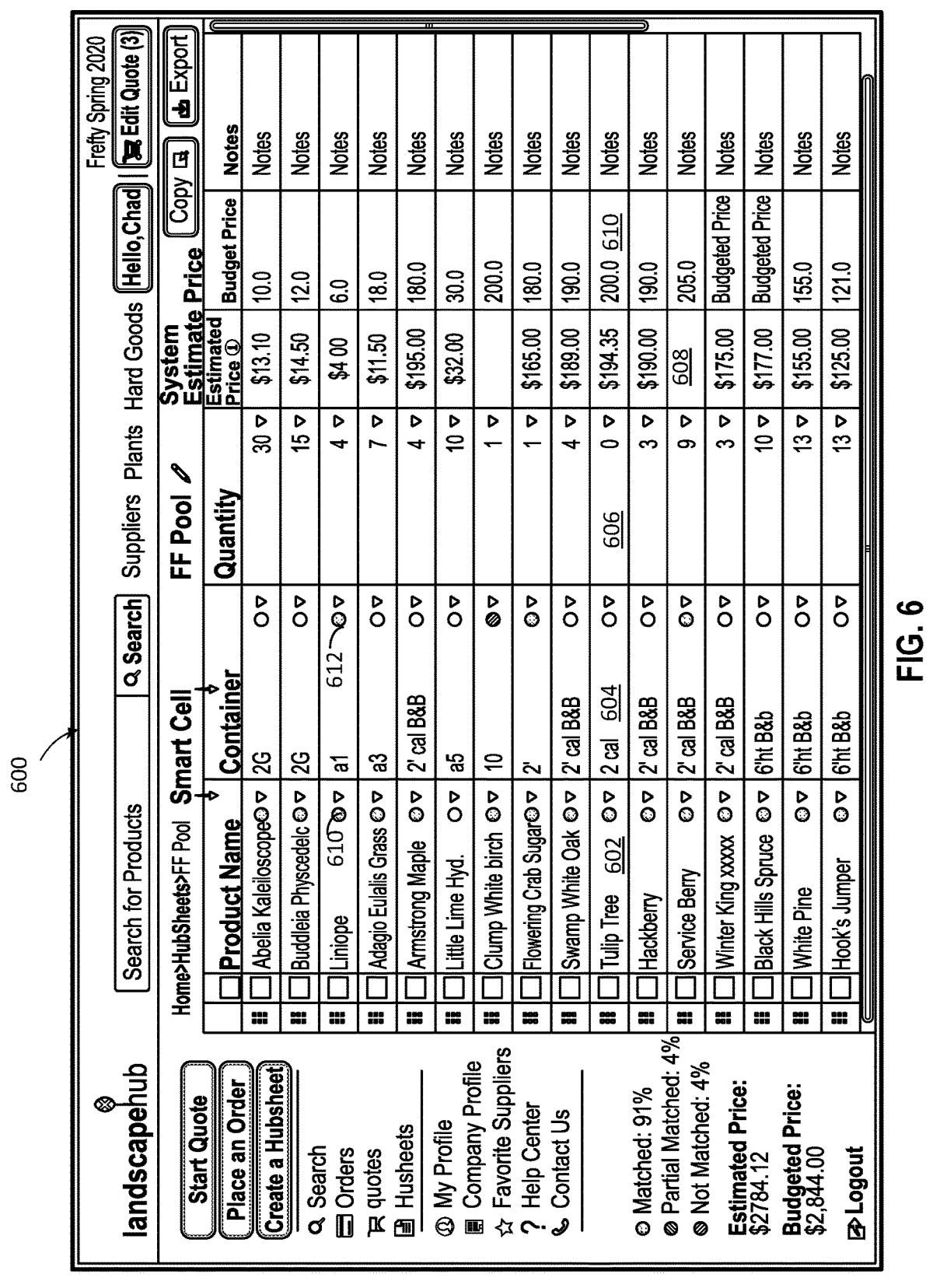

FIG. 6 illustrates a smart spreadsheet (600) with a typical smart cell display (i.e., Product Name Column (602)). Each smart cell typically consists of a color-coded indicator (610, 612) and a way to interact with the cell (i.e., dropdown arrow). The color-coded indicator (610, 612) is a quick way to display an insight to the user. Some cells are just normal and don't contain any extended functionality (i.e., Notes). When interacting with a smart cell (i.e., dropdown arrow), a mini application may pop up customized to that smart cell. These mini applications typically allow a user to interact with the smart cell data or display insights.

FIG. 7 is an example of an interactive smart cell (702) configured with a popped up mini application. This mini application allows a user to see that the users name for the product "*Abelia* Kaleidoscope" is the same standard product called "*Abelia grandiflora* 'Kaleidoscope'. The smart cell allows the user to override the match and pick a different standard product or to modify their product name. Notice the "green color" which indicates that the product is matched. For products where the builder (200) was not sure on the standard product, the color indicator (710) would be yellow or red to indicate to the user that action is required on their part.

Figure 8B:
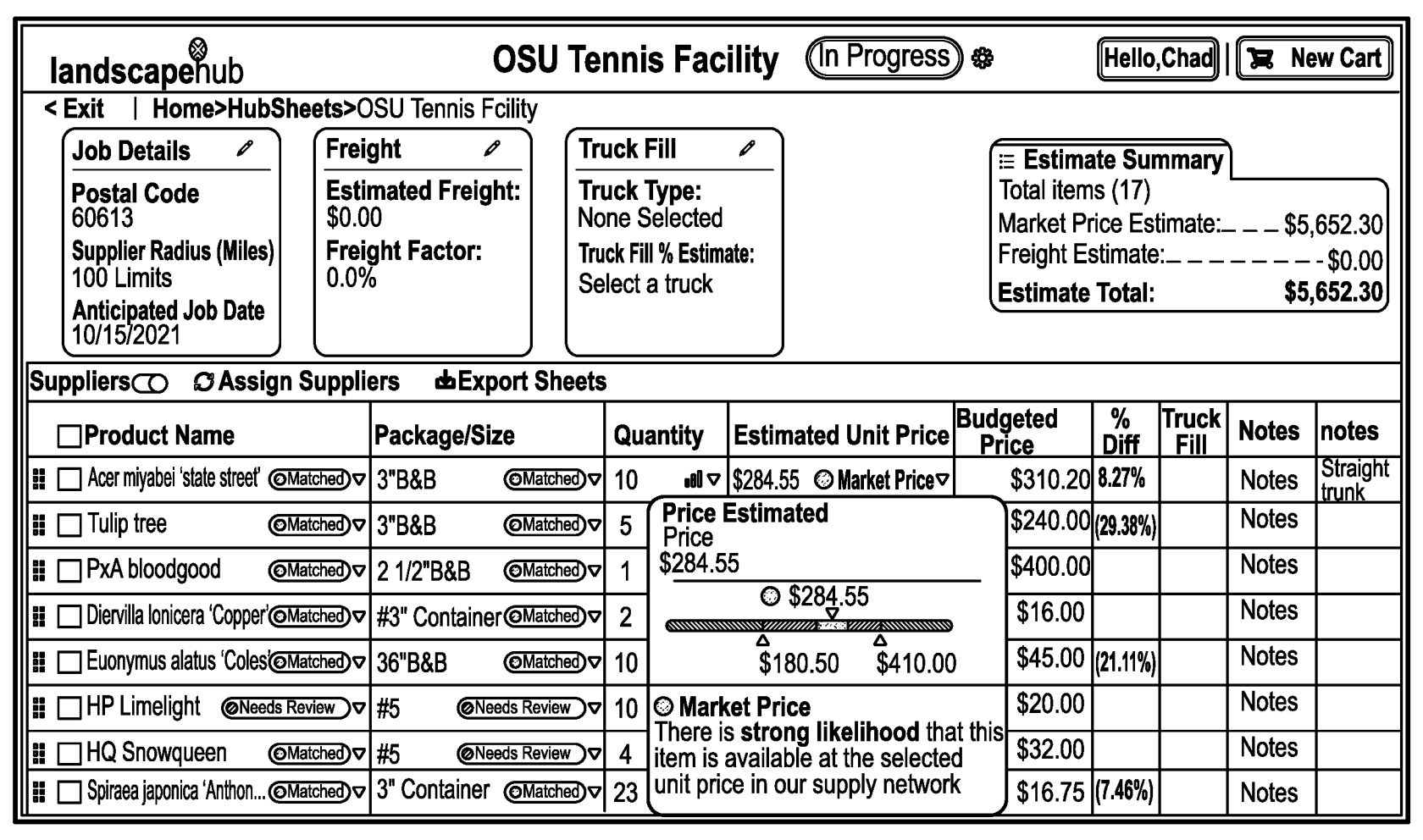

FIGS. 8A-8C are examples of an interactive smart cell displaying content information package size. FIG. 8A illustrates the smart cell mini application for the Container cell. In this example the Hubsheet Builder automatically mapped "2G" to the standard "#2 Container". The user can select a different standard package or container size from the list or search for a compatible container. FIG. 8B illustrates a smart cell that gives the user an understanding of the pricing variability of the suppliers of the suppliers that meet the user's preferences. Estimated unit price is calculated by the Hubsheet Builder engine based off the data from variety of suppliers and user specified settings (ie, radius to job site). The display is a boxplot visualization which gives the user insight into the pricing variability for this product. A user could interact with the slider display and adjust the estimated price that the user needs for this item. FIG. 8C illustrates a smart cell used to help a user understand the availability of the selected list item. The smart cell mini application allows a user to understand the availability constraints of this item. The color indicator (810) indicates how available this product may be procured.

FIG. 9 is a typical view of a smart spreadsheet (900) generated for a landscape job. It is shown that the smart spreadsheet (900) displays itemized plant names or landscaping supplies (902), and the associated procurement information including: plant size or product size, packaging or container sizes (904), units per package or per container, quantity (906), unit price or per package price (908), brands or supplier's information, availability and location information (910) of each items.

FIG. 10 is a typical view of a spread sheet showing a location of tools. FIG. 10 illustrates that tools (e.g., Hub Sheets Tools) may be found typically as buttons (1006) at the top of the Hubsheet or embedded in the header row for the smart spreadsheet.

FIG. 11 illustrates a supplier's tool performing searches for a landscape job. FIG. 11 illustrates a "Find Suppliers" tool (1106), which a user may pick one of three methods to select suppliers. This tool (1106) may be used multiple times on the same list. Once the tool (1106) is used, the user may override the supplier selected at an individual row level in order to customize to their liking. The exemplary methods may be illustrated as below:

Method 1: the executed program code may be used to find the best suppliers for user's list. In an example, the executed program code may look at many factors including rankings or ratings by customers to determine the best suppliers to use for the job: for example, how much of the list a supplier can fill, location of the supplier (distance to job), the time of year the job will be going on, suppliers fulfillment rating (how good are they at fulfilling orders with no issues), and other factors about the Job and the contractors personal preferences (i.e., the user may choose to pick up own materials). This program code may also use artificial intelligence to improve the algorithm to produce the best procurement path.

Method 2: Based on a buyers favorited list of suppliers, the executed program code may determine the best mix of those suppliers. The same factors as above may apply but the number of suppliers may be limited to just their favorites.

Method 3: Choose a single supplier. The executed program code may allow a contractor to pick a supplier and that supplier will be automatically matched to all items that they can supply. A contractor may use the program to do this multiple times until they have their list all matched to supply. In this scenario the user will be able to choose if they want that supplier to be assigned to only items that don't have a supplier or all items on the list that the supplier can fulfill. The user will also be able to indicate if they'd like to use this supplier as the only supplier and for the system to provide substitutes to match to the list (a substitute will allow for a different package/size or for a similar product).

Method 4: Pick a supplier manually for each item on the list. This method is done at the row level and the user can pick a specific supplier for an individual row and override any supplier selection that already exists for that row.

FIG. 12 is an example of manually overriding tool results. FIG. 12 illustrates an example with a Hubsheet (also referred to as smart spreadsheet in the description) that has some suppliers assigned but the user may select or modify his favorite suppliers through the tool (1206) for each item (row) in the smart spreadsheet using the supplier smart cell.

Figure 13:

FIGS. 13-18 are steps to order selected items for a landscape job:

FIG. 13 illustrates an example of a user selecting individual items from their list to Order. In step 1, each item is selected by checking the checkbox at the beginning of the row. By checking the checkbox (1301) in the header, all rows would be selected. In this example it is displayed that only partial of the materials list is selected for ordering.

Figure 14:
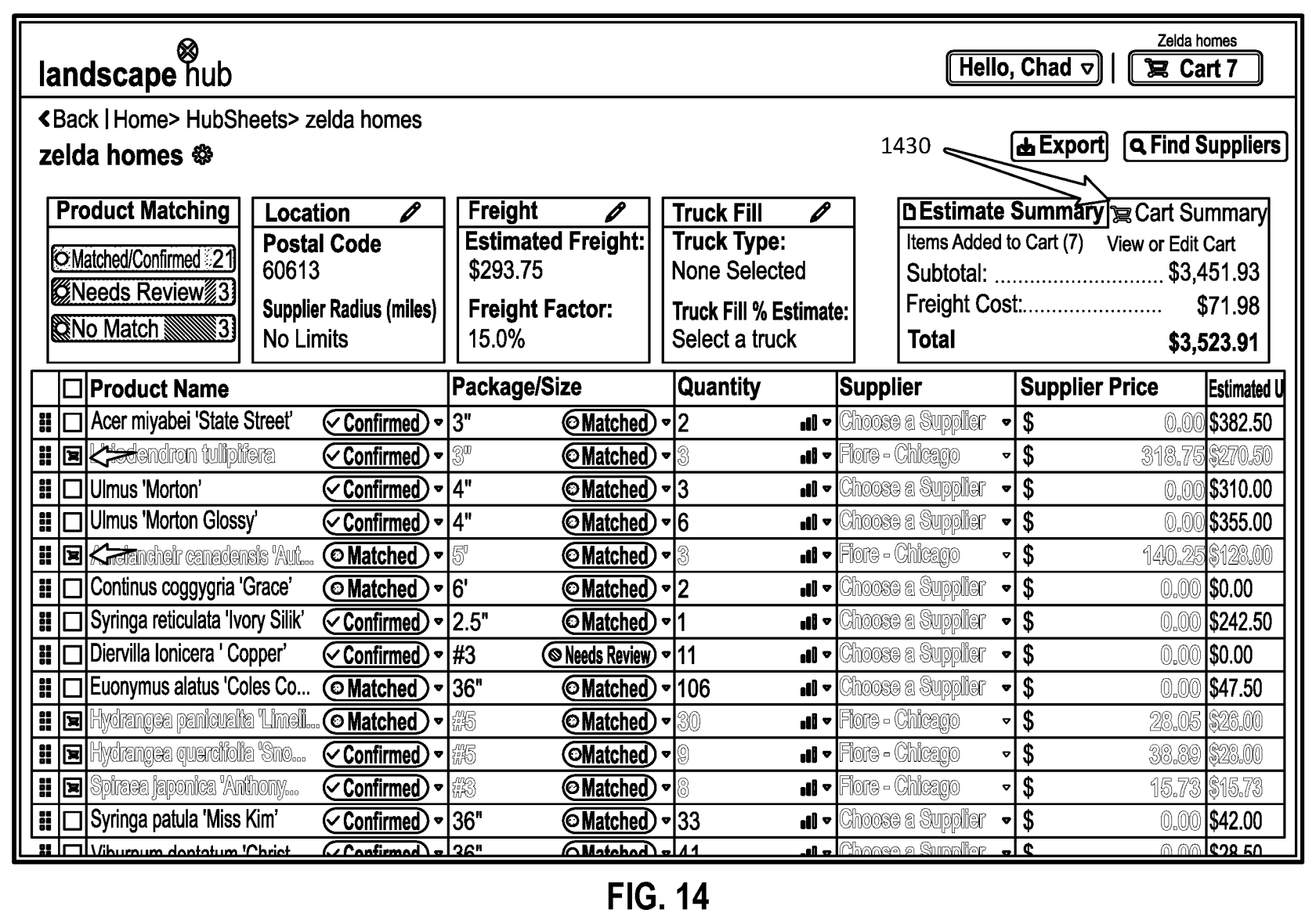

FIG. 14 illustrates a cart summary in the upper right of the Hub Sheet that summarizes the items selected for the order. In step 2, The user or the executed program code may add the selected product to checkout cart with an "Add to Cart" button (1430) on the smart spreadsheet. A cart summary now appears at the top as well as "cart" icon shown on the lines are in the cart.

FIG. 15 illustrates in step 3, the user or the executed program code may proceed to check out (1530) with a generated total cost.

FIG. 16 illustrates in step 4, the user may edit the order or account information (1630) prior to placing an order in the checkout cart.

Figure 17:
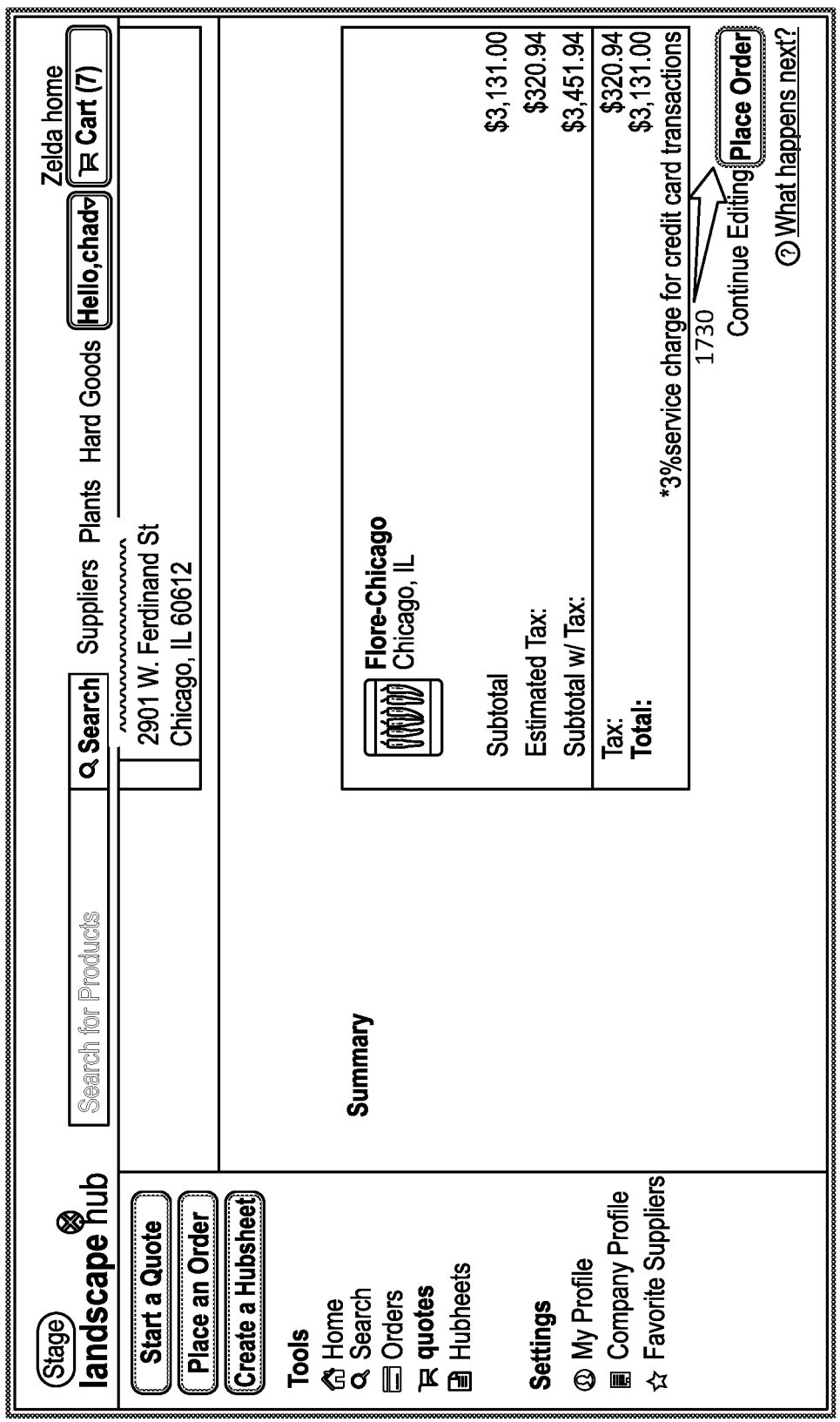

FIG. 17 illustrates in step 5, the user may place an order (1730) in the checkout cart.

FIG. 18 illustrates in step 6, the order in the checkout cart has been submitted (1830).

Figure 19:
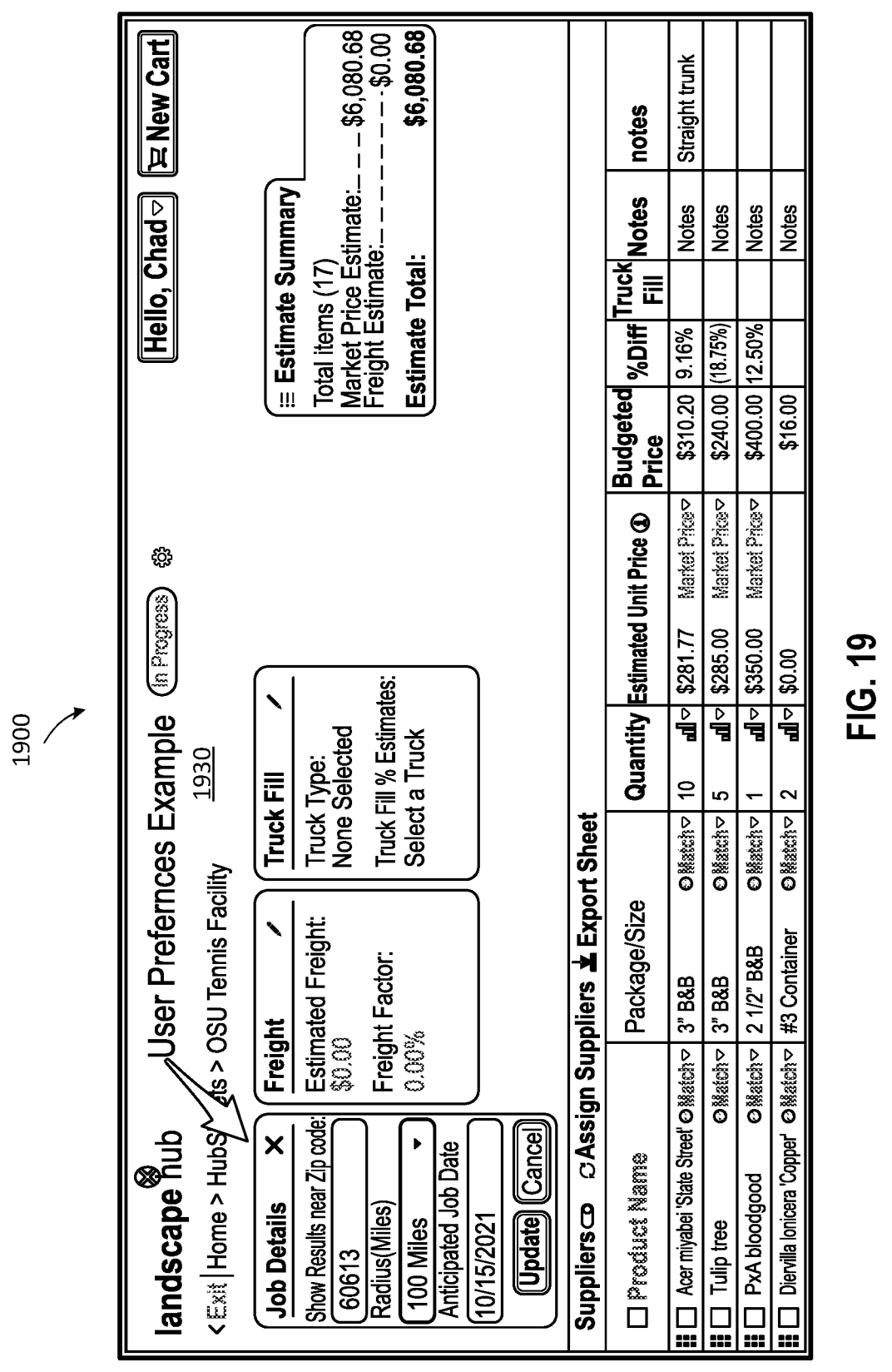

FIG. 19 is an example of customizing the smart spreadsheet (1900) with user preferences for a landscape job, such as setting some preferences. In this example, the user may set the jobs zip code and the radius (1930) from that zip code to source supply from. Only suppliers within that radius are considered valid for estimating and procurement needs.

A supplier of landscape material may use the smart spreadsheet (1900) as a pricing/inventory management tool. The analytics provided by the smart spreadsheet (1900) can be used for Price adjusting (up or down), deciding what products to start producing/stop producing, and other supplier related insights. The smart spreadsheet (1900) allows a supplier to upload their inventory into the smart spreadsheet (1900) and automatically receive data insights about their inventory. A supplier selling on the platform can also directly pull their data into the smart spreadsheet (1900) to receive those same insights and modify their pricing or other info and republish their data to the platform allowing for an intelligent way to manage the inventory on the platform.

FIG. 20 is an example of configuring a tool to automatically adjust contents of the smart cell based on user preferences, which some of the data elements may be adjusted based on the selected user preferences. At least the estimated unit price and the quantity (2030) of the main smart cells may change based on the radius to job site. This feature in the spread sheet may be useful if a user would like to pick up the material themselves or to limit the logistics cost to ship the material.

Figure 21:
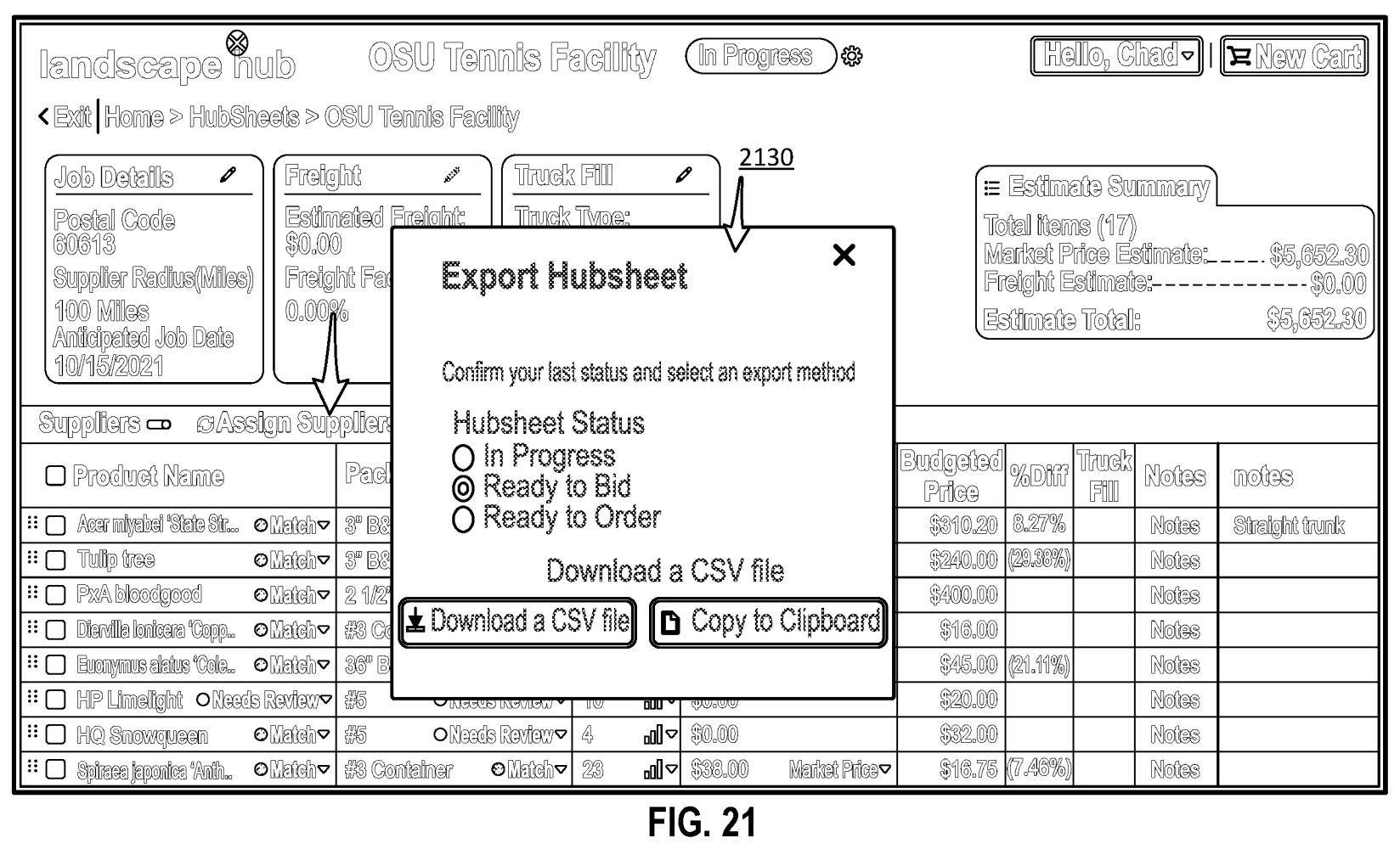

FIG. 21 is an example of a tool exporting the data in the smart spreadsheet. FIG. 21 illustrates a user using the "Export" tool (2130) to use the data and insights from the Hubsheet in an external system. A user may export the data from the smart spreadsheet and use this data in another system (excel, ERP system or other computer system). For partner systems of the platform, the export can be automatically integrated into the users ERP system without the need for any manual processing of an exported file. An exported file may contain all the original data the user uploaded plus additional data from the smart spreadsheet (e.g. market pricing, standard SKU numbers).

FIG. 22 is an example of a tool estimating freight cost for a landscape job. A user estimating a job may also use the estimating tool to create a bid. The bid may be competitive (multiple companies bidding for the work). When bidding, a user may use the smart spreadsheet to query market pricing based on all the suppliers' inventory within the database. The user can decide to narrow the suppliers based on user preferences to get more accurate pricing. Some of those preferences include distance to job site, type of supplier, supplier open hours etc. Upon setting preferences, the smart spreadsheet will automatically adjust the data to reflect the user's preferences.

FIG. 22 illustrates a user that's enabled the "logistics" tools (2230) to better understand the shipping needs required to fulfill their list of materials. The logistics tools help estimate cost of shipping and also how much of a truck the material will require. Many of the landscape products are live plants and cannot be shipped via traditional shipping methods and they don't easily fit in a box so estimating truck size needs requires a proprietary software that the platform has developed.

Figure 23:
Figure 24:
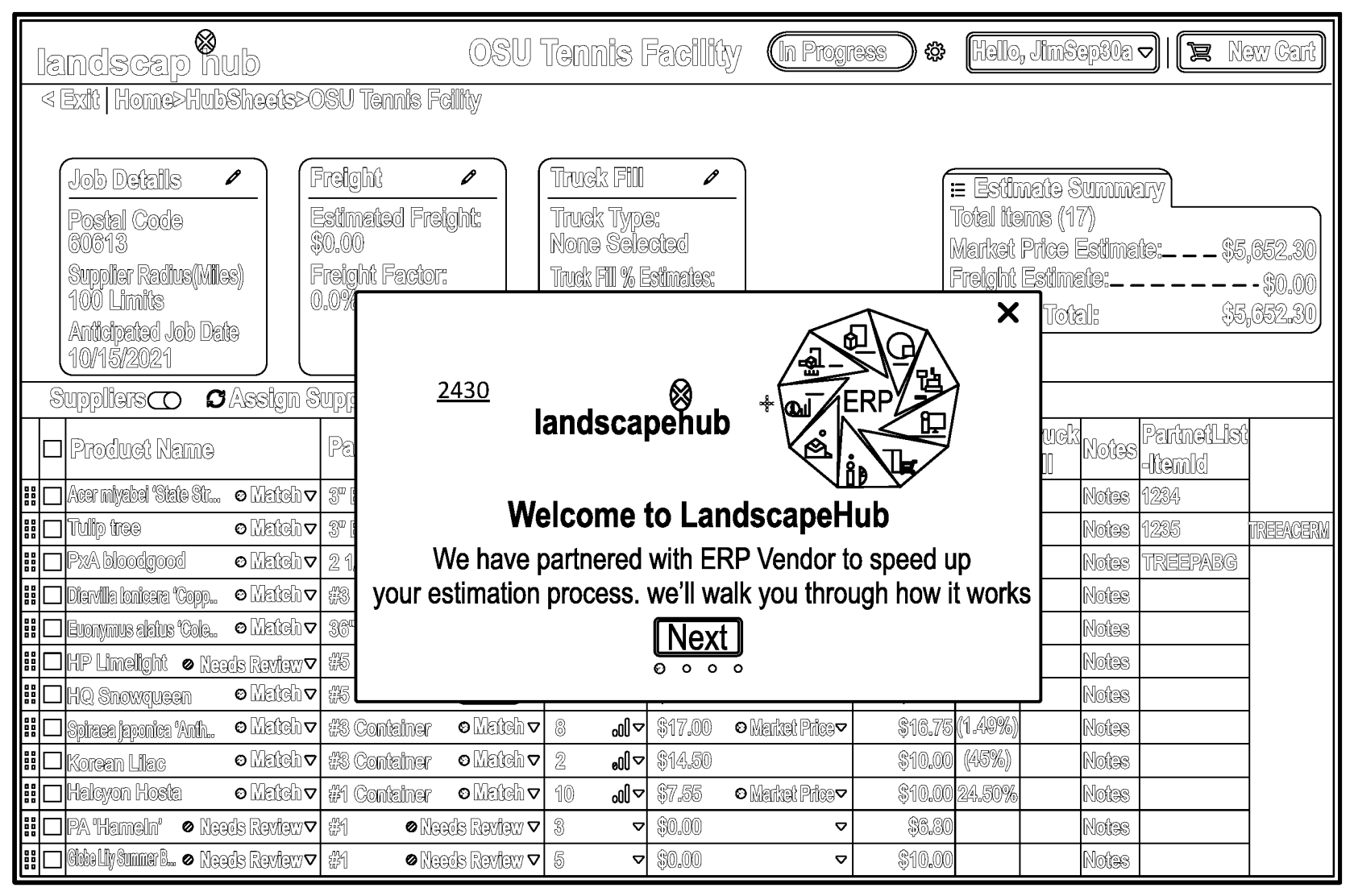

FIG. 23-25 are examples of raw data of a user's material list from a third-party system are imported, translated and matched via a one-click API.

FIG. 23 illustrates a sample third party system (2304). The illustration is showing what a landscape job's materials list may look like. In an example, the 3rd party system provider (2304) (e.g., ERP system) has integrated the one-click smart spreadsheet API. To send this materials list/job to a Hub Sheet, the user just clicks the "Order/Quote on Landscape-Hub" button (2302).

FIG. 24 is an example of an API (e.g., a welcome wizard (2430)) importing a material list through a one-click set up. FIG. 24 illustrates what a new 3rd party user would see if this is the first materials list that they have sent to a smart spreadsheet. A welcome wizard (2430) may be displayed to give the first-time user some guidance.

FIG. 25 is an example of "collector" program code functions after interacting with a 3rd party system (e.g., ERP) to import a materials list or job to display the smart spreadsheet (2500), after normalizing and analyzing market data and availability status.

Figure 26:
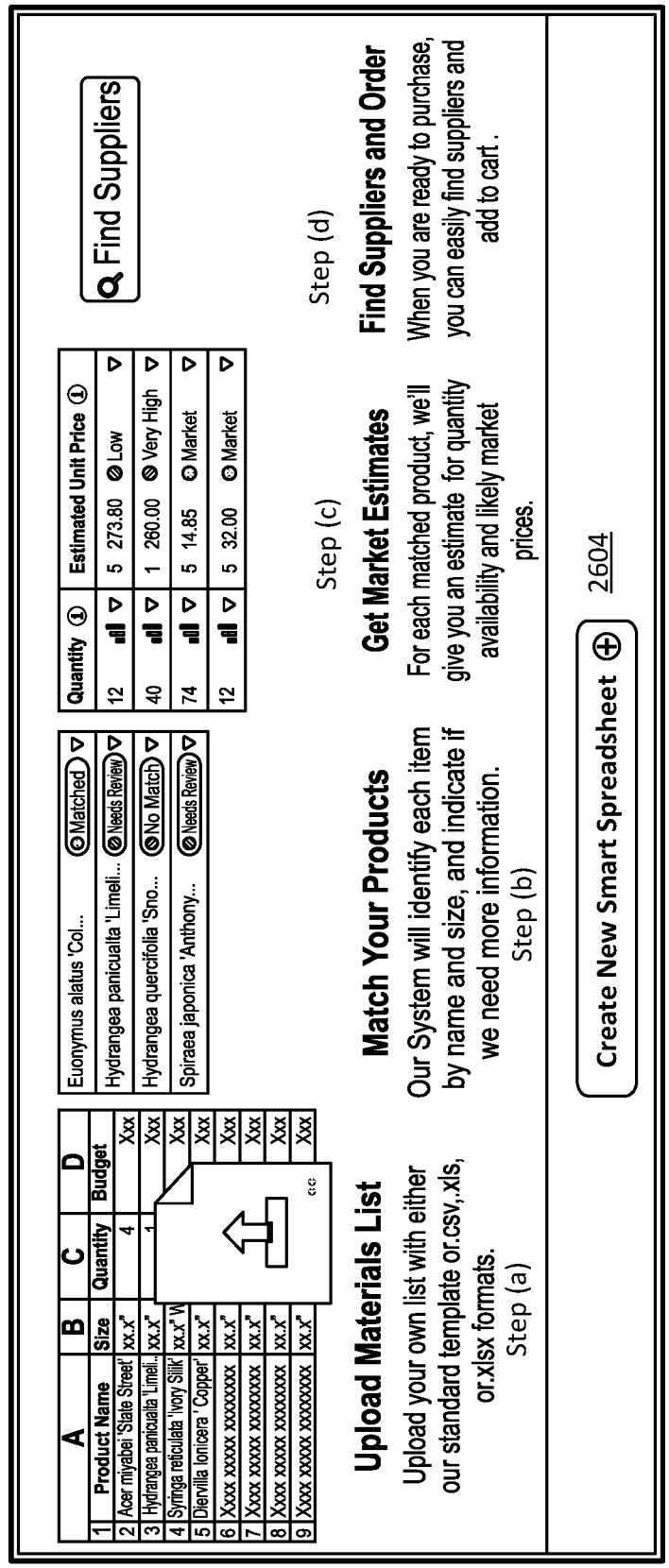
FIG. 26 is a simplified process flow diagram of the algorithm for processing products listed in a landscaping project.
Figure 27A:
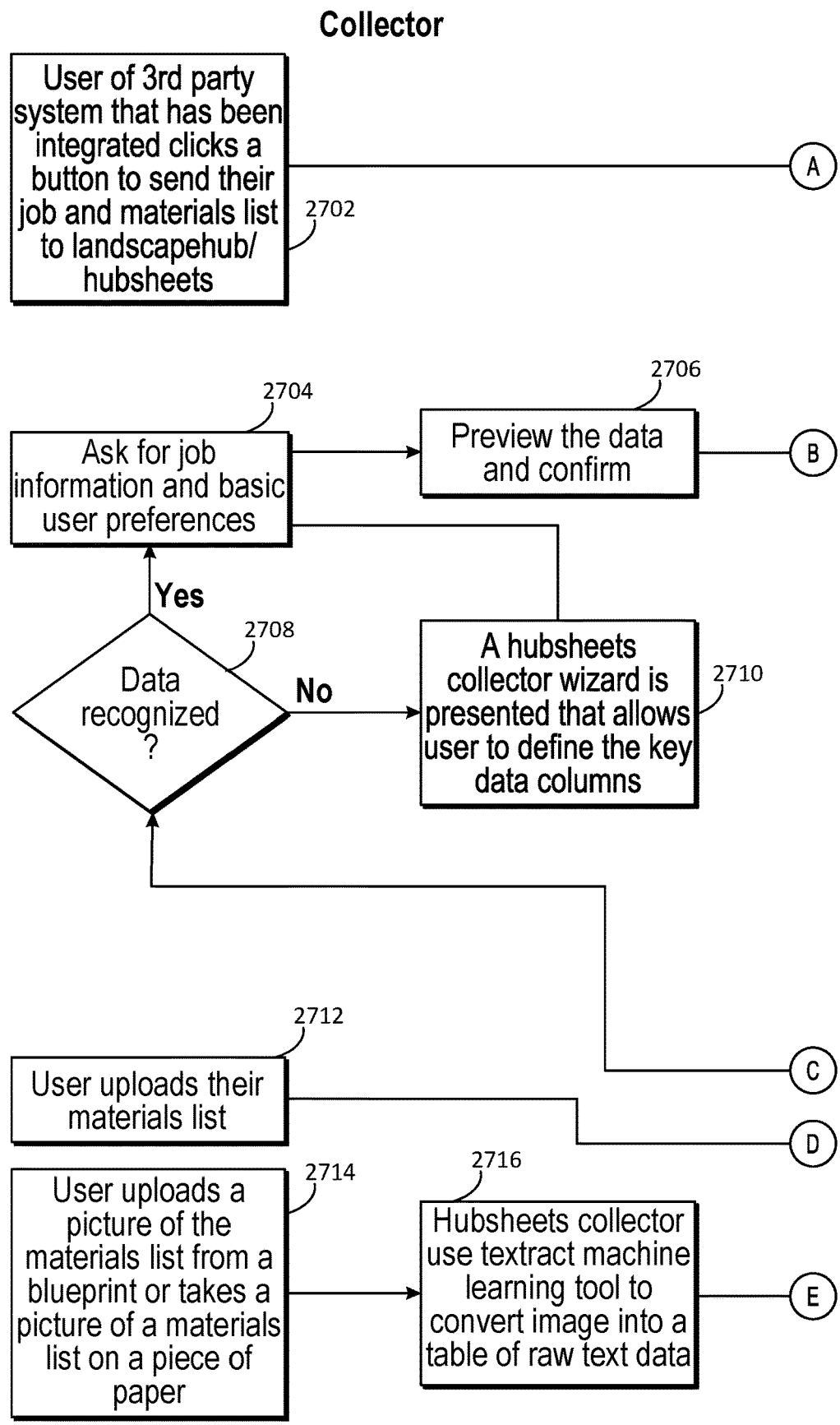
FIGS. 27A-27D is a detailed process flow diagram of a method for processing products listed in a landscaping project.
Figures 27B, 27C:
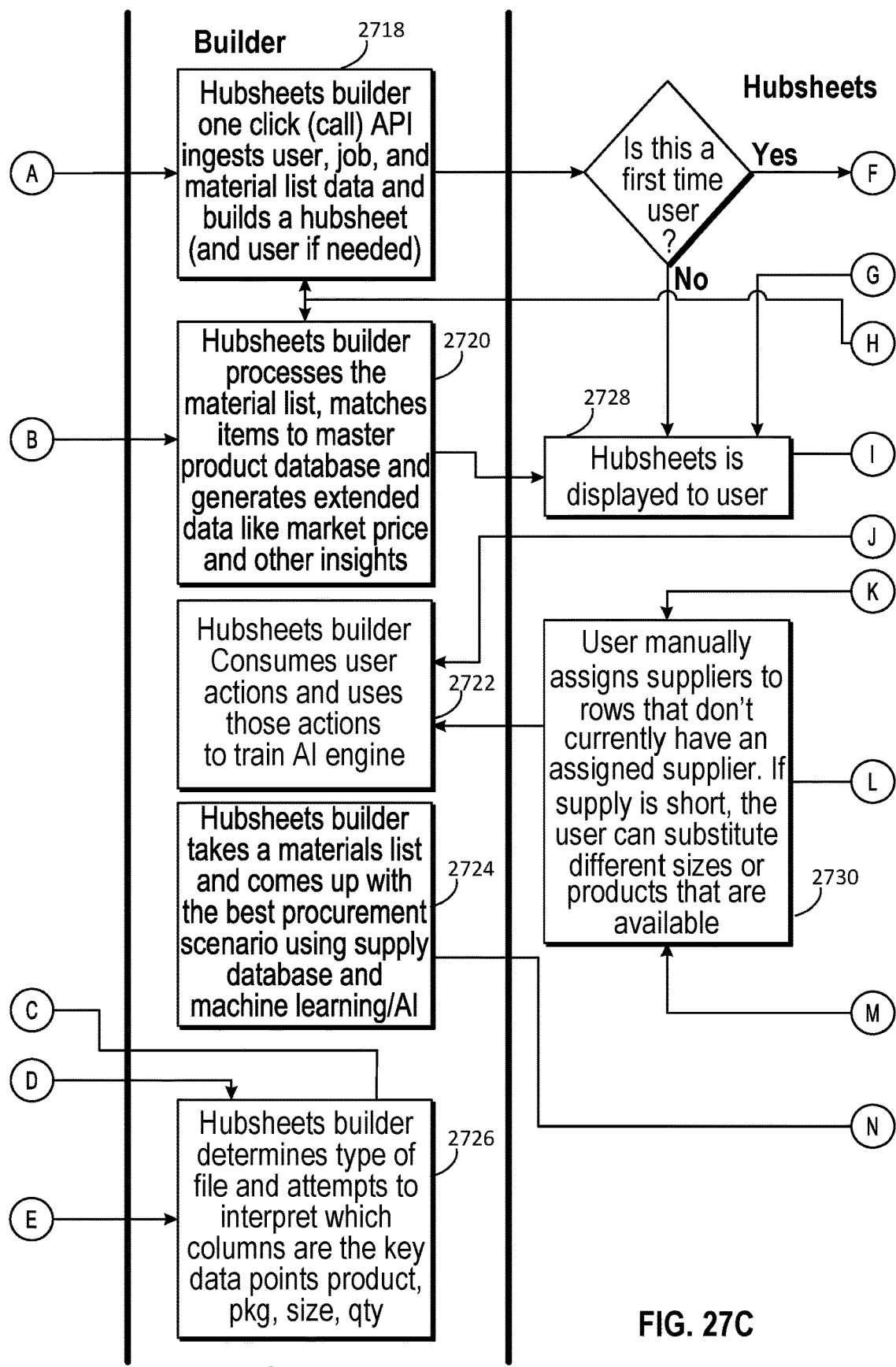
Figures 27C, 27D:
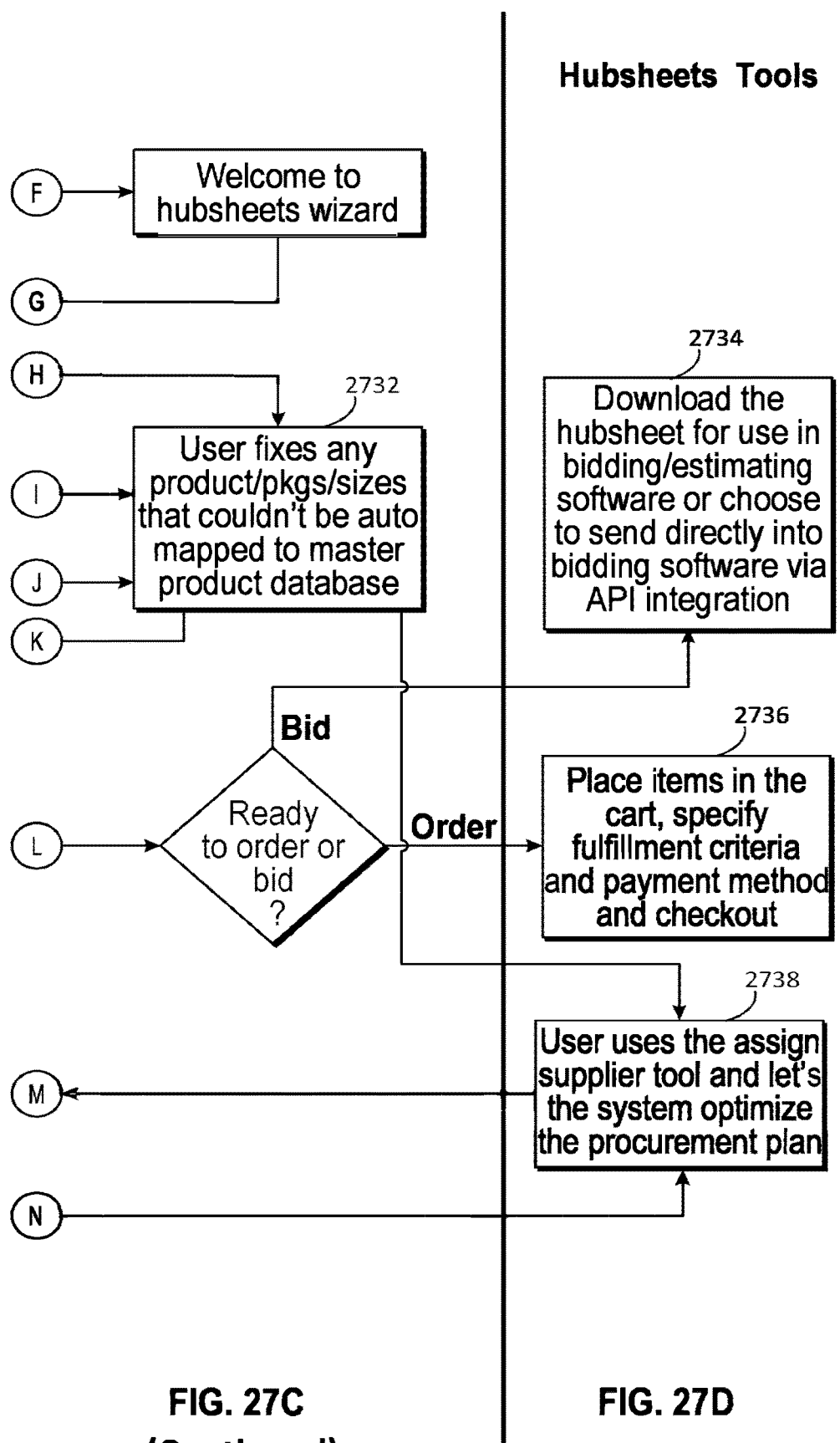

FIG. 26 is a simplified process flow diagram of the algorithm for processing materials listed in a landscaping project. FIG. 26 illustrates the steps of generating a smart spreadsheet (such as smart spreadsheet 2500) by a single "click" at the "Create New Smart Spreadsheet" button (2604) to import a material list and to carry out the steps from capturing uploaded data in step (a) to displaying an uploaded smart spreadsheet document (2500) with materials to be purchased in step (d). Once an order has been placed the corresponding purchase orders and invoices are automatically delivered to the corresponding suppliers and to the buyer.

FIGS. 27A to 27D and FIG. 28A and FIG. 28B have already been described and therefore will not be repeated.

Other systems, methods, features and advantages will be, or will become, apparent to one with skill in the art upon examination of the figures and detailed description. It is intended that all such additional systems, methods, features and advantages be included within this description, be within the scope of the disclosure, and be protected by the following claims. Steps mentioned in the disclosure may be carried out in any sequence or orders without limitation to achieve the intended objectives.

What is claimed is:

1. A computer implemented method for processing products listed in a landscaping project, comprising executing by at least a processor in a server, program code stored in a non-transitory computer-readable medium, wherein the executed program code cause the server to perform steps, comprising:
   collecting and capturing from a client device, open format raw data of a material list in a received file;
   translating the captured open format raw data of the material list into text format data;
   mapping the text format data to a master product database to generate a matched material list with associated procurement information for each item on the matched material list;
   generating a smart spreadsheet of the matched material list, comprising an array of smart cells, wherein the itemized plant names or landscaping supplies are displayed as contents in a designated column or row of the smart cells, and the associated procurement information are displayed in respective smart cells arranged in row or column corresponding to each respective plant name or landscape supplies;
   wherein at least one smart cell in the array that corresponds to a particular itemized plant name or landscaping supply is configured to display a match indicator that indicates a degree of matching of its content to a target value;
   when a degree of matching of the content indicates less than the target value, adjusting the match indicator corresponding to the at least one smart cell to a desired range value for another search of a substitute in the master product database;
   forwarding to the client device, the smart spreadsheet for user's selections or modifications to the contents in the smart cells according to user's preference;
   in response to a user's preference input from the user device to modify the content of at least one smart cell, updating the spread sheet; and
   displaying on the user device, a total cost estimate for bidding or for procurement of at least a portion of the products for the landscaping project.

2. The computer implemented method of claim 1, wherein the smart spreadsheet of matched material list comprising one or both of: itemized plant names or landscaping supplies, and the associated procurement information comprising one or a combination of: plant size or product size, packaging or container sizes, units per package or per container, unit price or per package price, brands or suppliers information, availability and location of each items.

3. The computer implemented method of claim 2, wherein the server communicates through a network with the client device using an integrated Application Program Interface (API) which interacts with a third party enterprise system (ERP) to establish a secured session with the client device for transmission of the material list and forwarding the spread sheet to the client device of the matched material list with the associated procurement information including a cost estimate of the items in the matched material list to the client device.

4. The computer implemented method of claim 3, wherein the material list is directly imported through the API in its current format without conforming to a specific format standard, wherein the open format raw data in the material list comprising one of: a word file, an Adobe pdf file, an Excel file, a comma separated values (CSV) file, an email file, a printed document, a handwritten note, a blueprint, a scanned image, a picture file and an audio file.

5. The computer implemented method of claim 4, wherein the API interacts with a third party text translation software to translate the captured open format raw data into text format data by performing one of:
   directly using text format data from the word file, CSV file, the email file, the Excel file or the printed document,
   using an image capturing software or an optical character recognition (OCR) software tool to translate captured image data from the handwritten note, the pdf file, the blueprint, the scanned image and the picture file into the text format data, using a speech recognition software to transcribe the audio file into text format data.

6. The computer implemented method of claim 5, wherein the text format data are text string matched to the matched material list with associated procurement information using one of: (i) a database management system's text and query engine plus a code-based machine learning and AI libraries, and (ii) a postgres text engine and a python coded library, to match to the master product database.

7. The computer implemented method of claim 1, wherein each smart cell is configured to unfurl to display detail information of the content in the smart cell through embedded program code or through a link to the master product database, and the desired range value in the match indicator is reflected through one or both of: a color code and an amount of filling within a circular bubble.

8. The computer implemented method of claim 1, comprising automatically adjusting a portion of data in the smart cells according to the user preferences as procurement selection to achieve one or a combination of: better pricing, availability, distance from job site and favorite suppliers.

9. The computer implemented method of claim 8, wherein the procurement selection, comprising manually selecting by the user or automatic selecting by the executed program code, of different suppliers or products listed in the smart spreadsheet, based on user's preferences and job data for the landscaping project.

10. The computer implemented method of claim 9, wherein the procurement of the at least a portion of the products listed from among the selected different suppliers in the smart spreadsheet requires only a single checkout resulting in elimination of multiple checkouts from each respective supplier.

11. The computer implemented method of claim 1, comprising feeding back the content from at least a portion of the smart cells as artificial intelligence (AI) training to improve future procurement for the user.

12. The computer implemented method of claim 11, wherein the AI training comprising using historical data of matched plant names or landscaping supplies in the master product database to update one or more of: product codes, unit price or quantity price breaks, availability, delivery schedule, shipping location, shipment cost, distance from job site, supplier's rating and customers' review and best matched alternatives of the items in the matched material list for the landscaping project.

13. The computer implemented method of claim 11, wherein the AI training further comprising constantly polling or listening to suppliers' websites via a webhook event listener to update the master product database on one or more of: product codes, unit price or quantity price breaks, availability, delivery schedule, shipping location, shipment cost, distance from job site, supplier's rating and customers' review and best matched alternatives of the items in the matched material list for the landscaping project.

14. The computer implemented method of claim 13, further comprising once an order has been placed, sending event notifications to the user to update status of the landscaping project, wherein the event notifications comprising one or a combination of: product or plants shipment status, delivery schedule, invoice and payment status.

15. A computer algorithm comprising program code stored in a non-transitory computer-readable medium, the program code are executable by at least a processor in a server for processing products listed in a landscaping project, the computer algorithm, comprising:
 a collector code section, executable to perform:
  collecting and capturing from a client device, open format raw data of a material list in a received file; and
  translating the captured open format raw data of the material list into text format data;
 a builder code section, executable to perform:
  mapping the text format data to a master product database to generate a matched material list with associated procurement information for each item on the matched material list;
 a smart spreadsheet code section, executable to perform:
  generating a smart spreadsheet, comprising an array of smart cells, wherein the itemized plant names or landscaping supplies are displayed as contents in a designated column or row of the smart cells, and the associated procurement information is displayed in respective smart cells arranged in row or column corresponding to each respective plant name or landscape supply, wherein at least one smart cell in the array that corresponds to a particular itemized plant name or landscaping supply is configured to display a match indicator that indicates a degree of matching of its content to a target value;
 an interactive tool code section, executable to perform:
  when a degree of matching of the content indicates less than the target value, adjusting the match indicator corresponding to the at least one smart cell to a desired range value for another search of a substitute in the master product database;
  forwarding to the client device, the smart spreadsheet for user's selections or modifications to the contents in the smart cells according to user's preference;
  in response to a user's preference input from the user device to modify the content of at least one smart cell, updating the spread sheet; and
  displaying on the user device, a total cost estimate for bidding or for procurement of at least a portion of the products for the landscaping project.

* * * * *